(12) United States Patent
Bassily et al.

(10) Patent No.: US 9,669,884 B2
(45) Date of Patent: Jun. 6, 2017

(54) MODULAR AERODYNAMIC SKIRT ASSEMBLY

(71) Applicants: Georges Bassily, Laval (CA); Swaroop Kantharaju, Saint-Laurent (CA); Mathieu Boivin, Saint-Laurent (CA)

(72) Inventors: Georges Bassily, Laval (CA); Swaroop Kantharaju, Saint-Laurent (CA); Mathieu Boivin, Saint-Laurent (CA)

(73) Assignee: TRANSTEX COMPOSITE INC., Montreal (CA)

( * ) Notice: Subject to any disclaimer, the term of this patent is extended or adjusted under 35 U.S.C. 154(b) by 0 days.

(21) Appl. No.: 14/870,889

(22) Filed: Sep. 30, 2015

(65) Prior Publication Data

US 2016/0096558 A1  Apr. 7, 2016

Related U.S. Application Data

(60) Provisional application No. 62/058,341, filed on Oct. 1, 2014.

(51) Int. Cl.
  *B62D 35/02* (2006.01)
  *B62D 35/00* (2006.01)

(52) U.S. Cl.
  CPC ........... *B62D 35/001* (2013.01); *B62D 35/02* (2013.01)

(58) Field of Classification Search
  CPC .............................. B62D 35/02; B62D 35/008
  USPC ......... 296/180.1, 180.2, 180.4, 191; 206/335
  See application file for complete search history.

(56) References Cited

U.S. PATENT DOCUMENTS

| | | | | |
|---|---|---|---|---|
| 5,938,274 A * | 8/1999 | Ehrlich | ................ | B62D 29/045 296/181.3 |
| 8,579,359 B2 * | 11/2013 | Brown | ................ | B62D 25/168 280/851 |
| 8,727,425 B1 * | 5/2014 | Senatro | ................ | B62D 35/001 180/903 |
| 8,899,660 B1 * | 12/2014 | Praskovskaya | ...... | B62D 35/001 296/180.1 |
| 2006/0152038 A1 * | 7/2006 | Graham | ............... | B62D 35/001 296/180.1 |
| 2007/0120397 A1 * | 5/2007 | Layfield | ............... | B62D 35/001 296/180.4 |
| 2011/0209418 A1 * | 9/2011 | Drake | ....................... | B60P 3/34 52/79.5 |
| 2013/0076066 A1 * | 3/2013 | Wong | ................... | B62D 35/001 296/180.4 |
| 2014/0265438 A1 * | 9/2014 | Kronemeyer | ........ | B62D 35/007 296/180.4 |
| 2015/0375810 A1 * | 12/2015 | Dayton | ................ | B62D 35/001 296/180.4 |

* cited by examiner

*Primary Examiner* — Dennis H Pedder
(74) *Attorney, Agent, or Firm* — Mathieu Audet

(57) ABSTRACT

This invention relates to packaging of a modular aerodynamic trailer skirts that is adapted to minimize the size of a shipment thereof. The packaging further protects the skirt portions by stacking skirt portions and using interconnecting edges thereof to secure a skirt portion therebetween.

3 Claims, 39 Drawing Sheets

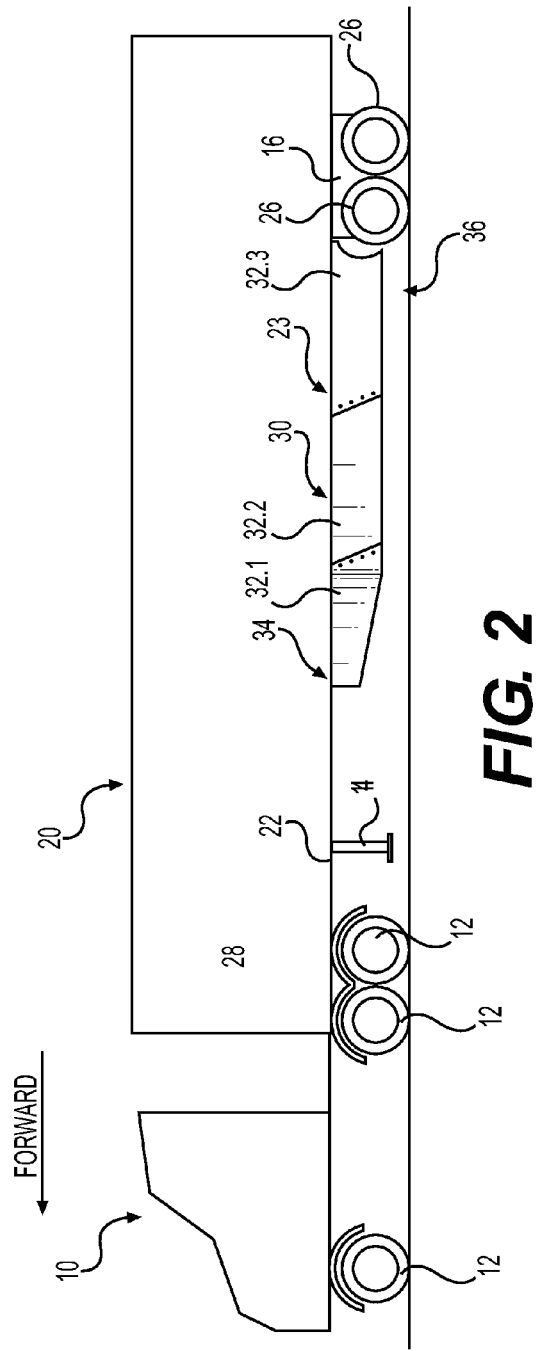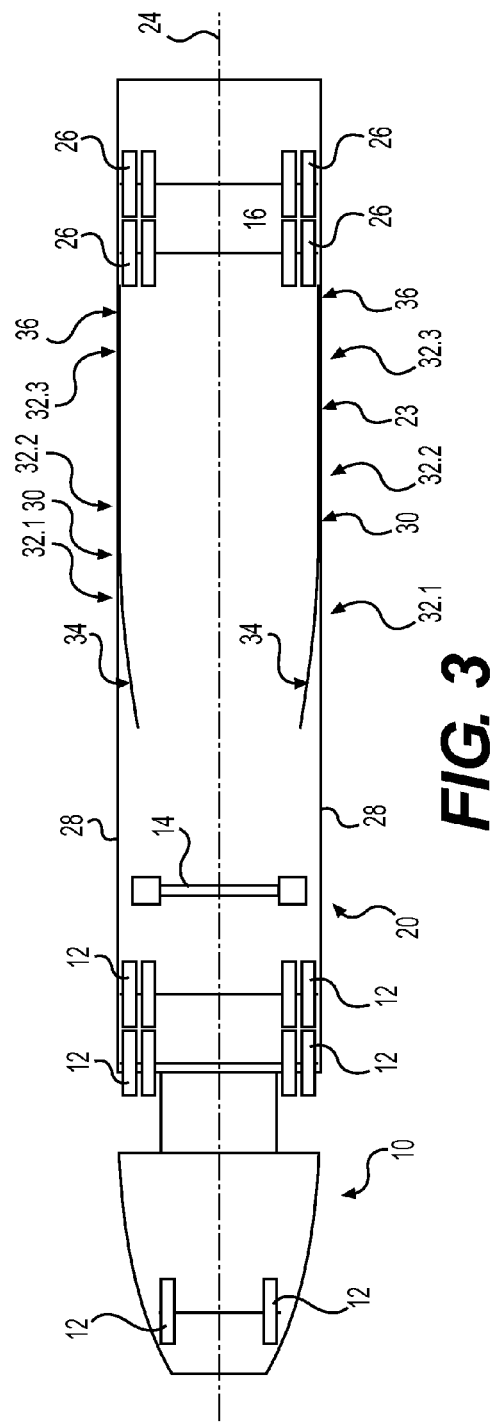

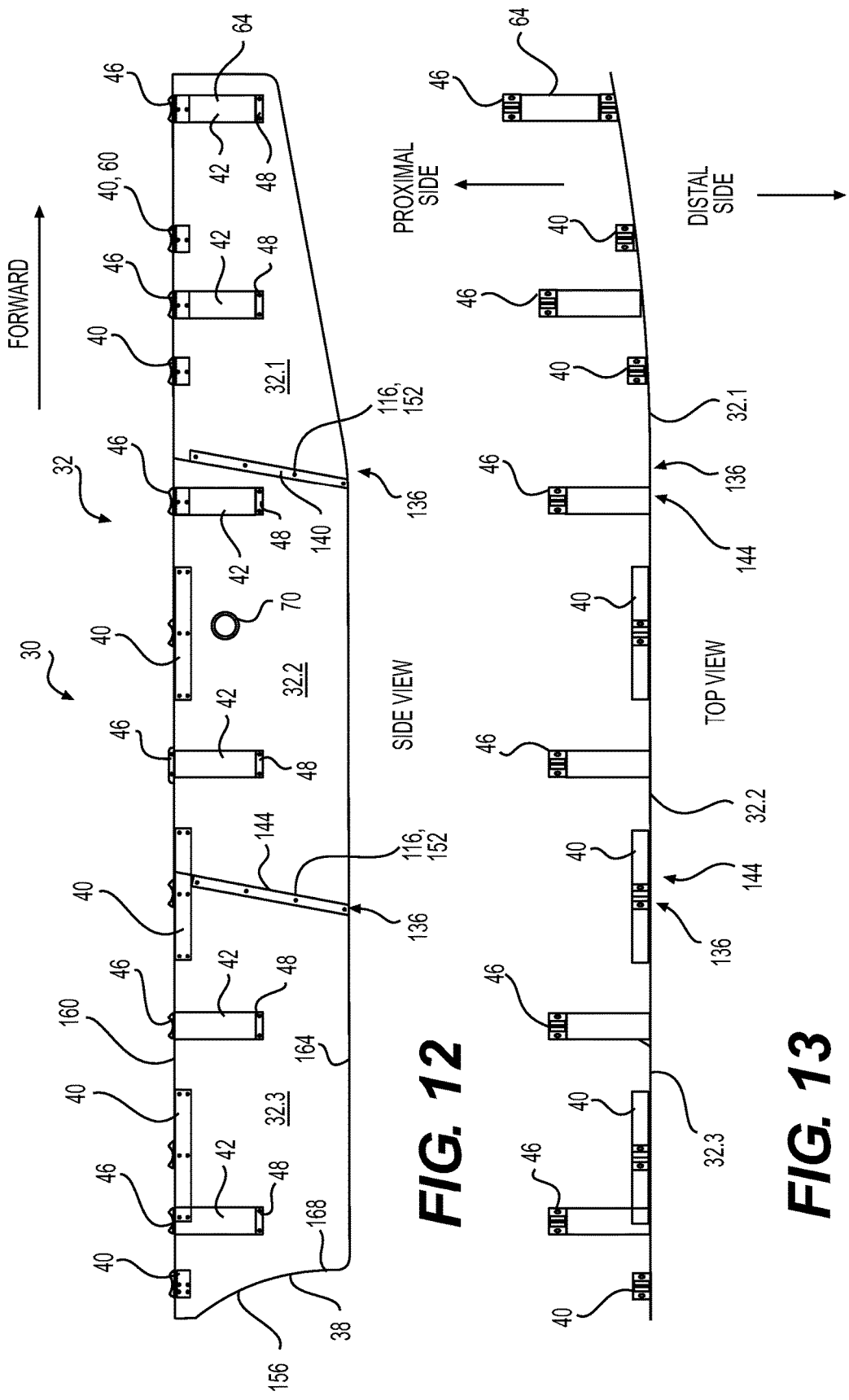

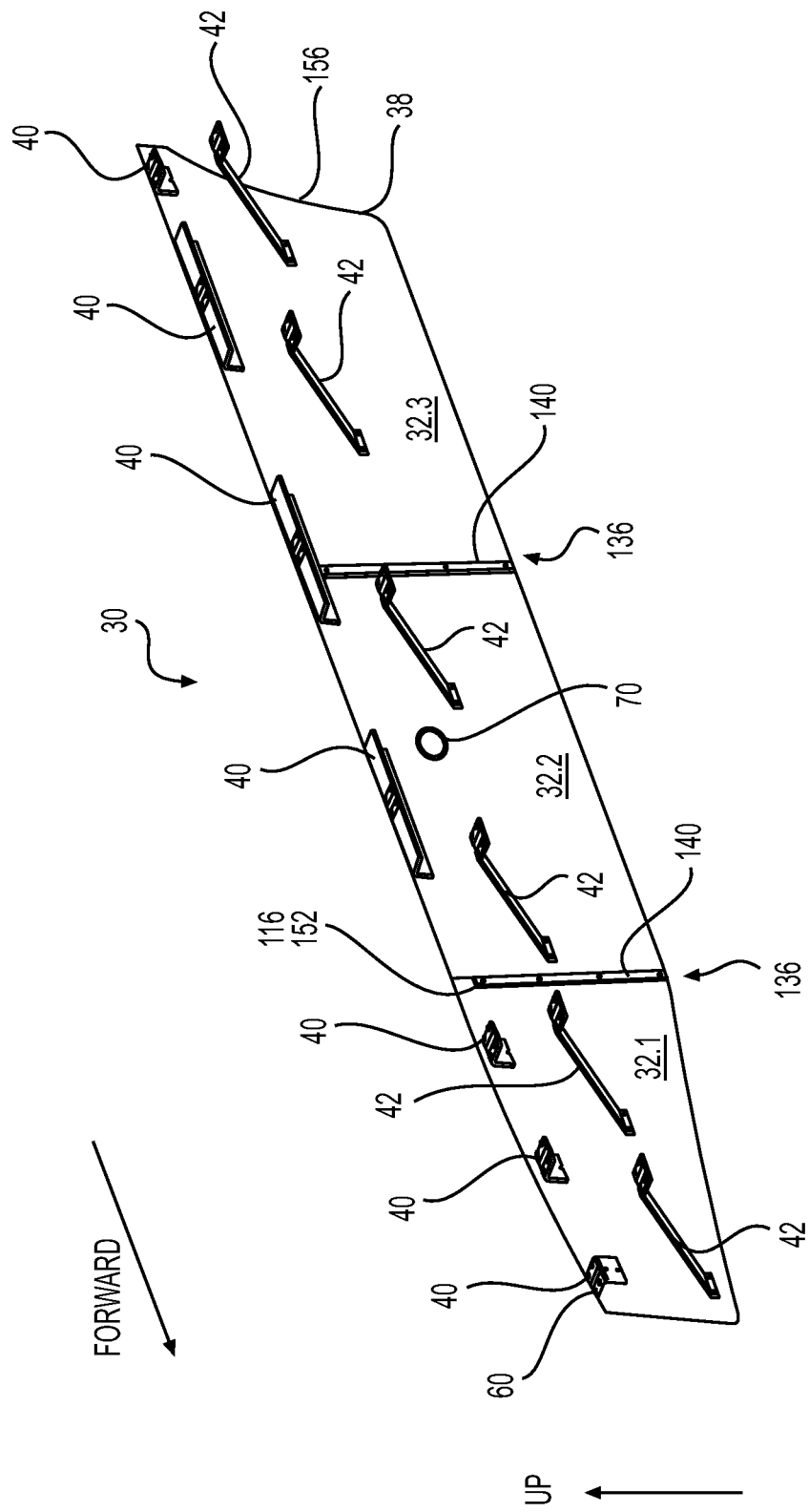

MODULAR AERODYNAMIC SKIRT ASSEMBLY

CROSS-REFERENCE

The present application relates to and is a non-provisional application of U.S. Patent application No. 62/058,341 filed Oct. 1, 2014 entitled MODULAR AERODYNAMIC SKIRT ASSEMBLY, this document is incorporated herein by reference in its entirety.

FIELD OF THE INVENTION

This invention relates to aerodynamic trailer skirts adapted to be mounted on trailers to improve the aerodynamic efficiency of the trailer. The present invention more precisely relates to a modular aerodynamic skirt packaging assembly and method thereof.

BACKGROUND OF THE INVENTION

Road tractors are generally used to pull trailers on roads to transport cargo. Aerodynamic apparatuses can be installed on the road tractor and/or on the trailer in order to reduce the aerodynamic air drag and improve fuel efficiency.

Trailer aerodynamic skirts are generally parallelly installed on both longitudinal sides of a trailer to help manage the flow of air around and underneath the trailer. Brackets are affixed to the trailer to secure the aerodynamic skirts positioned thereto. These aerodynamic skirts are secured to the bottom portion of the trailer, or on the sides of the trailer's floor, to ensure proper positioning when the vehicle is moving.

People who are familiar with the trucking industry know that trailers are subject to hazardous road conditions. The aerodynamic skirts, because of their position under the trailer's floor and their proximity with the road, are significantly vulnerable and might easily enter in contact with surrounding obstacles. The brackets holding the aerodynamic skirts, when put under significant stress, plastically bend and/or break to effect the aerodynamic skirts' position in respect to the trailer thus reducing the efficiency of the aerodynamic skirts. Moreover, the aerodynamic skirt itself might bend and/or break if they contact a foreign object. This also increases the operation cost and the maintenance time that is required.

The size of the aerodynamic skirts is substantial and shipping uninstalled aerodynamic skirts for remote installation is cumbersome. Aerodynamic skirts are generally considered by shipping companies to be of non-standard sizes and are too large to fit on a standard shipping pallet. They can be damaged during transport from the factory to the installation garage where the aerodynamic skirts are going to be installed on the vehicle because of their length and their width.

Aerodynamic skirts assembly are sustaining a significant amount of stress when deflecting air in their operating positions on a vehicle. Mechanical stresses and sustained vibrations are challenging the skirt assembly.

Therefore, there exists a need in the art for an improved aerodynamic skirt over the existing art. There is a need in the art for such an aerodynamic skirt assembly that can be easily and economically packaged and shipped. There is also a need in the art for an improved modular aerodynamic skirt assembly that is not jeopardizing the mechanical integrity of the aerodynamic skirt assembly. Moreover, there is also a need for a modular aerodynamic skirt assembly that is appropriately sustaining vibrations caused by the vehicle circulating on the road.

SUMMARY OF THE INVENTION

It is one aspect of the present invention to alleviate one or more of the drawbacks of the background art by addressing one or more of the existing needs in the art.

Accordingly, an aspect of our work, in accordance with at least one embodiment thereof, provides an improved aerodynamic trailer skirt over the prior art.

An aspect of our work, in accordance with at least one embodiment thereof, provides an aerodynamic skirt assembly adapted to be installed on a trailer to reduce the aerodynamic drag produced by the movement of the trailer when pulled by a road tractor.

An aspect of our work, in accordance with at least one embodiment thereof, provides a resilient aerodynamic skirt assembly that is adapted to bend when it contacts a foreign object and to self-recover its original position and shape thereafter.

An aspect of our work, in accordance with at least one embodiment thereof, provides a resilient aerodynamic skirt assembly that can be easily installed and economically manufactured.

An aspect of our work, in accordance with at least one embodiment thereof, provides a modular aerodynamic skirt including a plurality of skirt portions configured to be assembled together.

An aspect of our work, in accordance with at least one embodiment thereof, provides a modular aerodynamic skirt including a plurality of skirt portions sized and designed to be packaged on a cargo pallet with other struts and connectors for reduced shipping size.

An aspect of our work, in accordance with at least one embodiment thereof, provides a plurality of skirt portions sized and designed to be secured together to form a complete aerodynamic skirt assembly adapted to be installed on a trailer in an operating aerodynamic configuration.

An aspect of our work, in accordance with at least one embodiment thereof, provides a plurality of skirt portions sized and designed to be secured together, the skirt portions being secured together with cooperating edges locates at an angle from vertical, when installed on a trailer, to distribute mechanical stresses thereof when the aerodynamic skirt assembly is bending when contacting a foreign object.

An aspect of our work, in accordance with at least one embodiment thereof, provides a plurality of skirt portions sized and designed to be secured together with cooperating edges disposed at an angle from vertical to form a complete aerodynamic skirt assembly and reduces stresses, forces, moments and displacements the aerodynamic skirt assembly experiences by sharing the loads on several fasteners securing the skirt portions together.

An aspect of our work, in accordance with at least one embodiment thereof, provides a plurality of skirt portions sized and designed to be secured together in a fashion allowing a progressive transfer of a wave traveling therein caused by a shock applied on the skirt from one skirt portion to an adjacent skirt portion.

An aspect of our work, in accordance with at least one embodiment thereof, provides a plurality of skirt portions sized and designed to be secured together with cooperating edges disposed at an angle of about 10° from vertical to form a complete aerodynamic skirt assembly and to reduce stresses, forces, moments and displacements the aerodynamic skirt assembly by simultaneously sharing the loads on several fasteners securing the skirt portions together.

An aspect of our work, in accordance with at least one embodiment thereof, provides an aerodynamic skirt assembly designed to have a natural frequency that is different from the excitation frequency of the trailer in motion.

An aspect of our work, in accordance with at least one embodiment thereof, provides supports securing the skirt to the trailer disposed at the junction between adjacent skirt portions to reduce the mechanical stress at cooperating interconnecting edges thereof.

An aspect of our work, in accordance with at least one embodiment thereof, provides a method of locating skirt supports in locations reducing or modifying the natural frequency of the aerodynamic skirt assembly.

An aspect of our work, in accordance with at least one embodiment thereof, provides an aerodynamic skirt assembly positioning supports thereof at locations causing a reduction or a modification of the natural frequency of the aerodynamic skirt assembly.

An aspect of our work, in accordance with at least one embodiment thereof, provides an aerodynamic skirt assembly made of composite materials offering a significant range of elastic deformation.

An aspect of our work, in accordance with at least one embodiment thereof, provides a resilient strut adapted to secure a skirt panel to a trailer, the strut being made of a resilient material adapted to sustain significant deformation and adapted to resiliently self-recover its original shape.

An aspect of our work, in accordance with at least one embodiment thereof, provides strut supports made of non-metallic material.

An aspect of our work, in accordance with at least one embodiment thereof, provides a shock-resistant trailer aerodynamic skirt that is sized and designed to allow a temporary deflection of a bottom portion of the skirt panel upon contact of a foreign object.

An aspect of our work, in accordance with at least one embodiment thereof, provides a fastening system for easily securing the skirt panel to the trailer; the fastening system uses a limited number of parts to reduce the assembly time and the weight added to the trailer.

An aspect of our work, in accordance with at least one embodiment thereof, provides an aerodynamic skirt assembly comprising a plurality of support members adapted to secure the skirt panel to the trailer.

Embodiments of the present invention provides a skirt assembly kit comprising a plurality of cooperating skirt panels adapted to longitudinally be disposed on a trailer to route air about the trailer, a plurality of upper supports adapted to secure the skirt panel to the trailer and a plurality of struts adapted to secure the skirt panel to the trailer.

An aspect of our work, in accordance with at least one embodiment thereof, provides an aerodynamic modular skirt assembly having a reduced size for shipping. The larger parts of the modular skirt assembly, the pair of skirt panels, are separated in a plurality of smaller skirt portions adapted to be superposed for reducing the cargo size.

An aspect of our work, in accordance with at least one embodiment thereof, provides a shipping configuration using at least one of the skirt portions on two opposed sides of a cargo arrangement and locate the additional parts of the modular aerodynamic skirt assembly between skirt portions for reduced cargo size and strength of the cargo arrangement.

An aspect of our work, in accordance with at least one embodiment thereof, provides a method of packaging a modular aerodynamic skirt panel, the method comprising providing a plurality of skirt portions; and stacking the plurality of skirt portions, wherein the area covered by the stacked skirt portions is within the area of a larger of the skirt portions.

An aspect of our work, in accordance with at least one embodiment thereof, provides a modular aerodynamic skirt packaging, the packaging comprising a plurality of skirt portions staked one on top of the other, wherein the area covered by the stacked skirt portions is within the area of a larger of the skirt portions.

An aspect of our work, in accordance with at least one embodiment thereof, provides a modular aerodynamic skirt assembly kit comprising a plurality of skirt portions staked one on top of the other, wherein the area covered by the stacked skirt portions is within the area of a larger of the skirt portions.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure:

FIG. 2 is a left elevational view of the road tractor of FIG. 1;

FIG. 3 is a bottom plan view of the road tractor of FIG. 1;

FIG. 12 is a right side elevational view of a skirt assembly;

FIG. 13 is a top plan view of a skirt assembly;

FIG. 14 is a front-right isometric view of a skirt assembly;

DETAILED DESCRIPTION OF PREFERRED EMBODIMENTS

A preferred embodiment of the present invention is described bellow with reference to the drawings.

Figure 1:
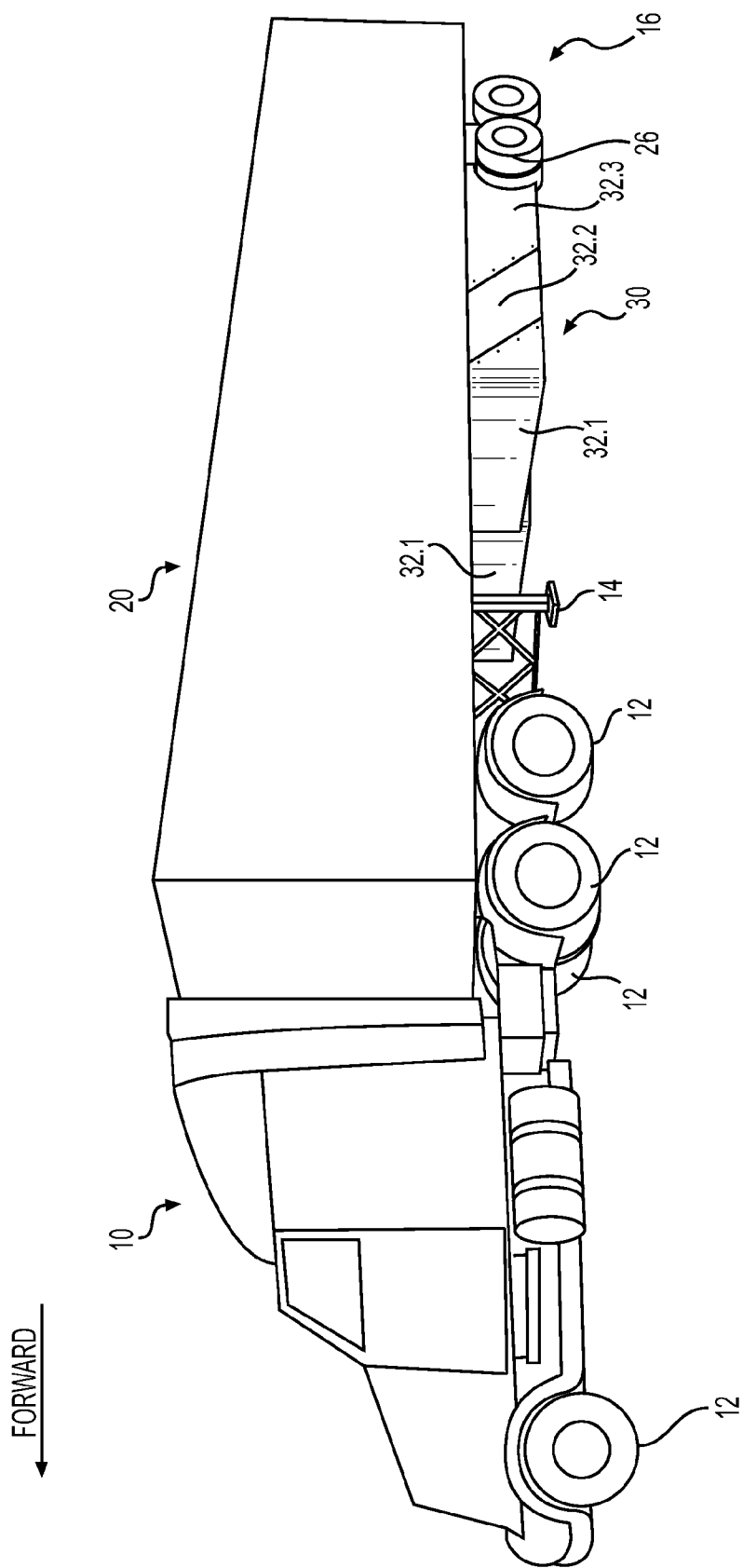
FIG. 1 is a perspective view of a road tractor operatively connected to a trailer including a skirt assembly secured thereto.

FIGS. 1, 2 and 3 illustrate a road tractor 10 with a trailer 20 attached thereto equipped with a pair of skirt panels 31, installed on each side of the trailer 20, adapted to deflect and direct the airflow around the trailer 20 when assembled to the trailer 20. Each skirt assembly 30 includes a skirt panel 31 including a plurality of skirt portions 32.1, 32.2, 32.3, adapted to be disposed on the side of the trailer 20, and a plurality of securing members adapted to secure the skirt portions 32.1, 32.2, 32.3 to the trailer 20. Once installed on the trailer 20, the skirt assembly 30 helps channel the flow of air around the trailer 20 to reduce the air drag of the vehicle when the trailer 20 moves on the road, pulled by the road tractor 10.

Each skirt assembly includes three skirt portions 32.1, 32.2, 32.3 as exemplified in the illustrated embodiment. A different number of skirt portions 32 remains within the scope of the present invention although three skirt portions 32.1, 32.2, 32.3 is one preferred embodiment. Securing members securing the skirt panels 31 in an operating configuration on the trailer 20 are not illustrated on FIGS. 1, 2 and 3 and will be discussed in more details later in this specification.

The skirt assembly 30 of the present embodiment is mostly attached under the trailer 20, between the wheels 12 of the road tractor 10 and the wheels 26 of the trailer 20. The assembled skirt portions 32 can alternatively extend forward up to the trailer supports 14 of the trailer 20, and be secured thereto, thus preventing complex skirt portions 32 arrangements around, or through, the trailer supports 14. The skirt portions 32 are substantially vertically positioned on each side of the trailer 20, preferably on the lower edge of the trailer 20 vertical sidewalls, with a clearance with the ground by illustratively about 20-30.5 centimeters (about 8 to 12 inches) while other clearances remain within the scope of the present application. The air management around the trailer 20 provided by the skirt assembly 30 reduces the air drag created by the trailer 20 by directing the flow of air around and under the trailer 20. The flow of air would otherwise turbulently move around and under the trailer 20 to create substantial air drag having a negative effect on the aerodynamics of the trailer 20. The airflow management around the trailer 20 provided by the skirt assembly 30 helps maintaining laminar airflow around the trailer 20 that helps diminish fuel consumption of the road tractor 10. The skirt assembly 30 also improves the safety of the vehicle by providing a physical barrier that can significantly prevent foreign objects to get under the trailer 20.

As illustrated, the assembled skirt 30 is shaped with an optional progressive height of the front skirt portion's 32.1 forward section. The skirt panels 32 can alternatively also be installed at an angle, in respect to the vertical, on the trailer 20 to change the airflow pattern around the trailer 20 and more precisely adjust the aerodynamics to a particular vehicle shape and use.

Figure 4:
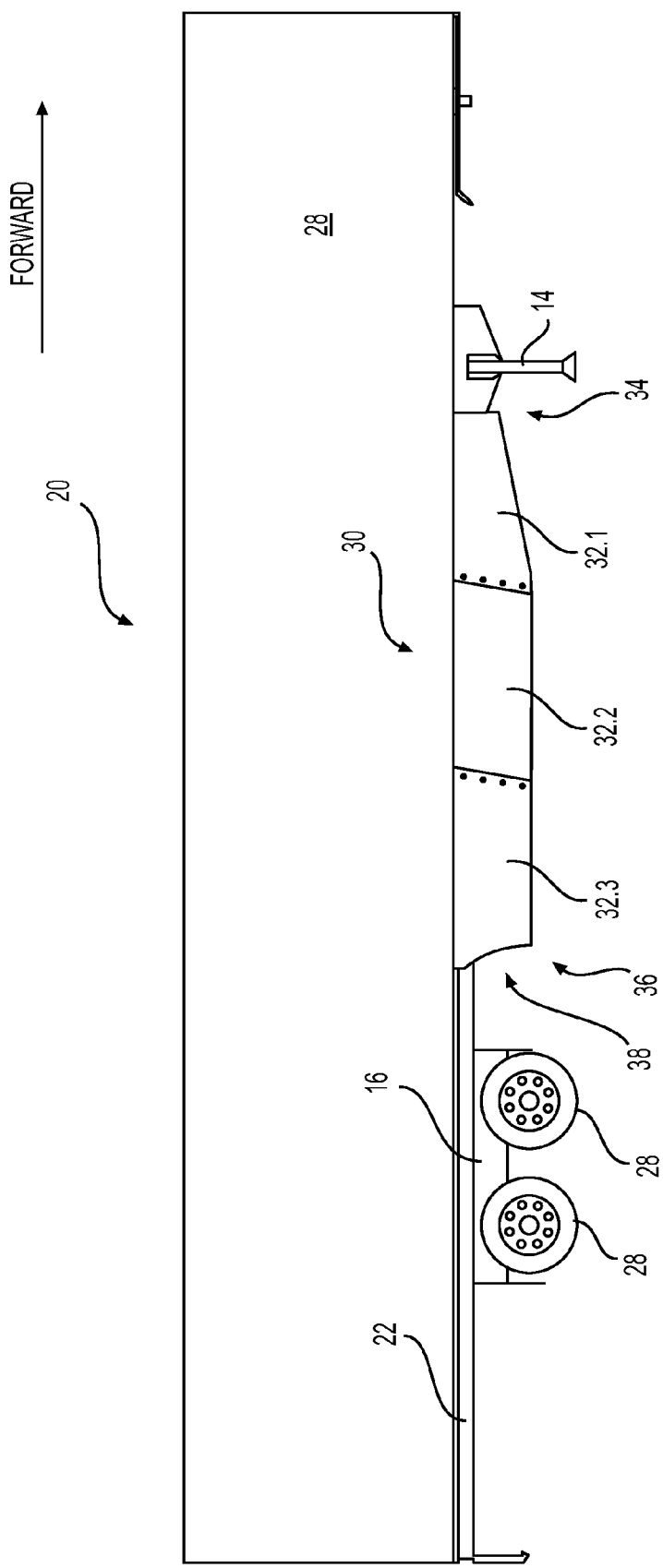
FIG. 4 is a left elevational view of a trailer of FIG. 1.

It can be appreciated from FIG. 3 that each skirt panel portion 32 is installed directly on the side's edge of the trailer 20 and, when seen from above, has a front portion 34 that progressively proximally leans toward a longitudinal center 24 of the trailer 20. The recessed front skirt portion 32.1 of the assembled skirt portions 32 improves the collection and routing of the turbulent airflow generated by the road tractor 10 thus improving the aerodynamic performance of the skirt assembly 30. Additional details about the shape of the skirt panel 31 will be provided in further details below. A right side of the trailer 20 equipped with a skirt assembly 30 is illustrated in FIG. 4. Each skirt assembly includes three skirt portions 32.1, 32.2, 32.3 in the illustrated embodiment. The skirt portions are embodied as three (3) different skirt portions 32 to split the length of the complete skirt panel 31 and facilitate its handling and shipping. Three skirt portions 32.1, 32.2, 32.3 in the present situation seems to shorten the skirt portions 32.1, 32.2, 32.3 in a sized compatible with standard shipping methods, however, a different number of skirt portions 32 could be used without departing from the scope of the present invention. The longitudinal length of each of the skirt portions 32.1, 32.2, 32.3 can be adapted to different configurations. In the present situation, the middle skirt portion 32.2 is embodied as the larger skirt portion 32 because, for instance, of its rather rectangular shape. Other proportions of skirt portion 32 lengths could be used without departing from the scope of the present invention.

Figure 5:
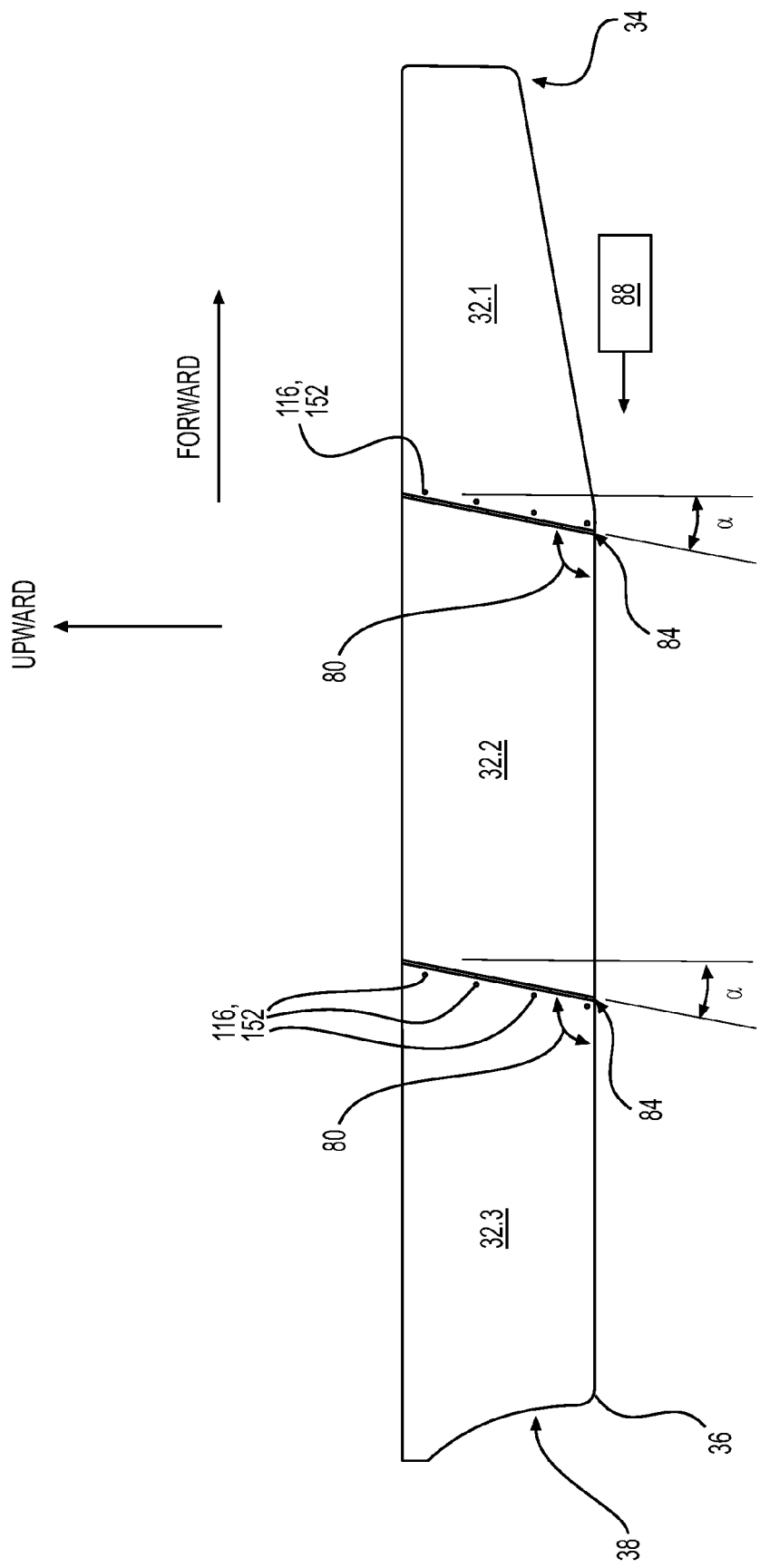
FIG. 5 is an elevational side view of a skirt.
Figure 6:
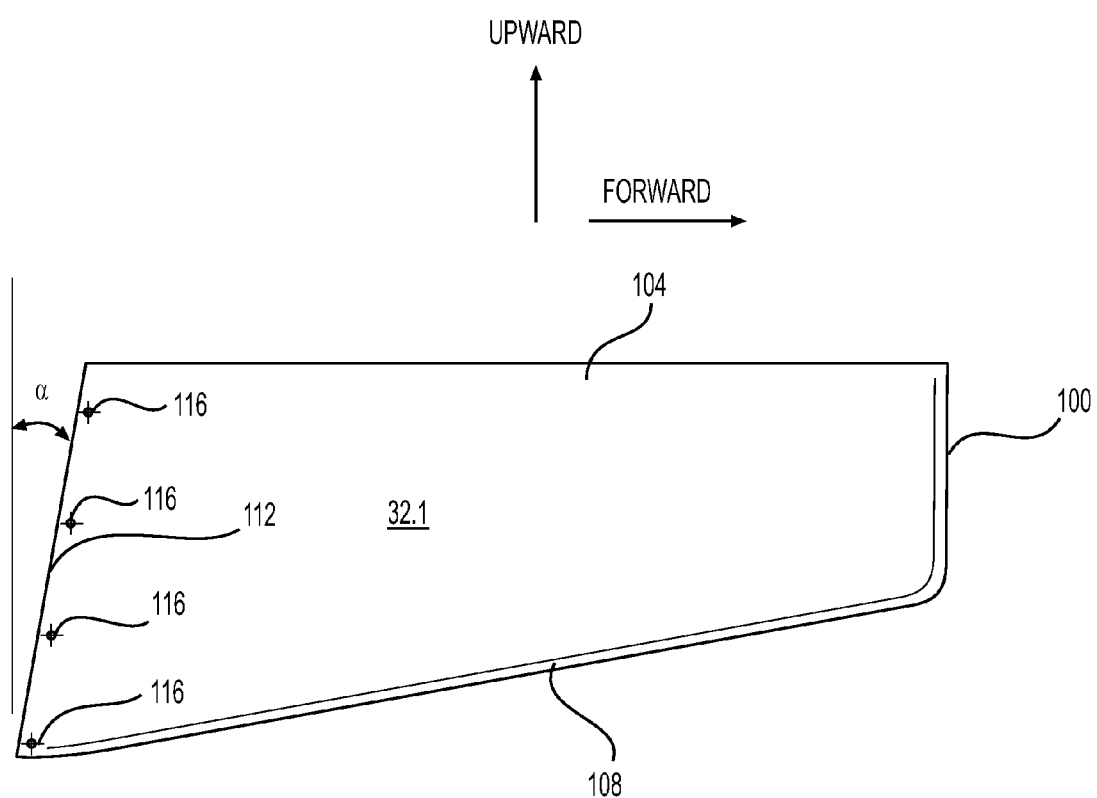
FIG. 6 is an elevational view of a skirt portion.
Figure 9:
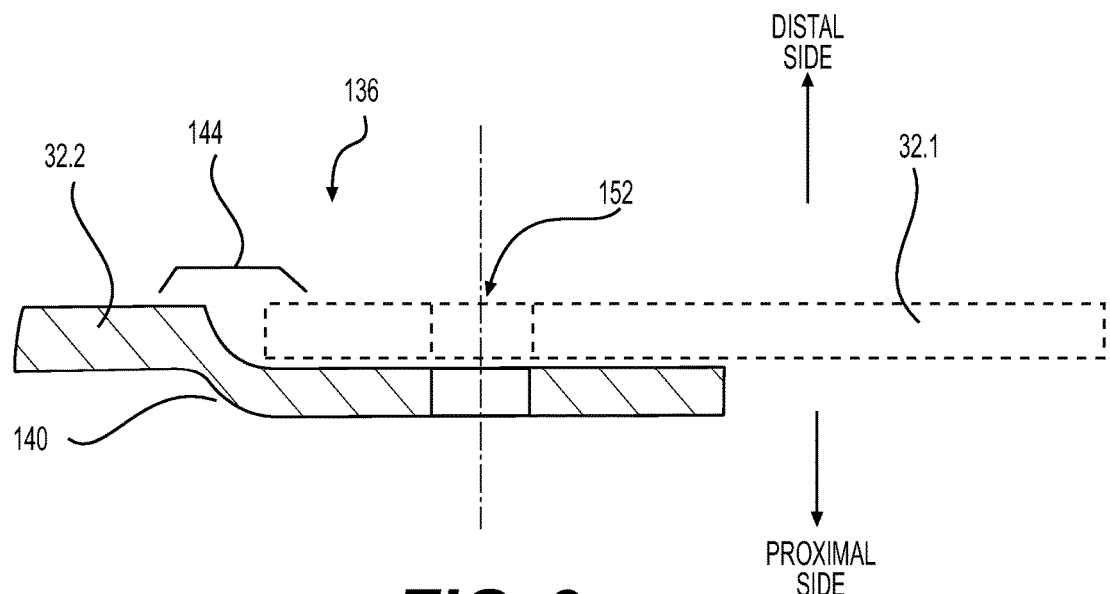
FIG. 9 is a section view of an interconnecting edge of a skirt portion.

Skirt portions 32 assembly is illustrated in FIG. 4 and its components are depicted in FIG. 5 throughout FIG. 9. FIG. 6 depicts the forward skirt portion 32.1. The forward skirt portion 32.1 is embodied with a straight vertical front edge 100, an upper rectilinear edge 104 adapted to match the bottom edge of the trailer 20, an angled bottom edge 108 configured to progressively manage the airstream around the trailer 20 and a rear edge 112 adapted to connect with the middle skirt portion 32.2. The rear edge 112 is preferably at an angle α to increase the mechanical strength of the skirt portions 32 assembly; the effect of angle α is going to be discussed below in greater details. The angle α create an obtuse angle 80 allowing the lower edges 84 of the middle skirt portion 32.2 and the rear skirt portion 32.3 to slip over an external object 88 when the aerodynamic skirt assembly 30 is installed in an aerodynamic configuration and the trailer 20 is moving in a forward direction.

Figure 7:
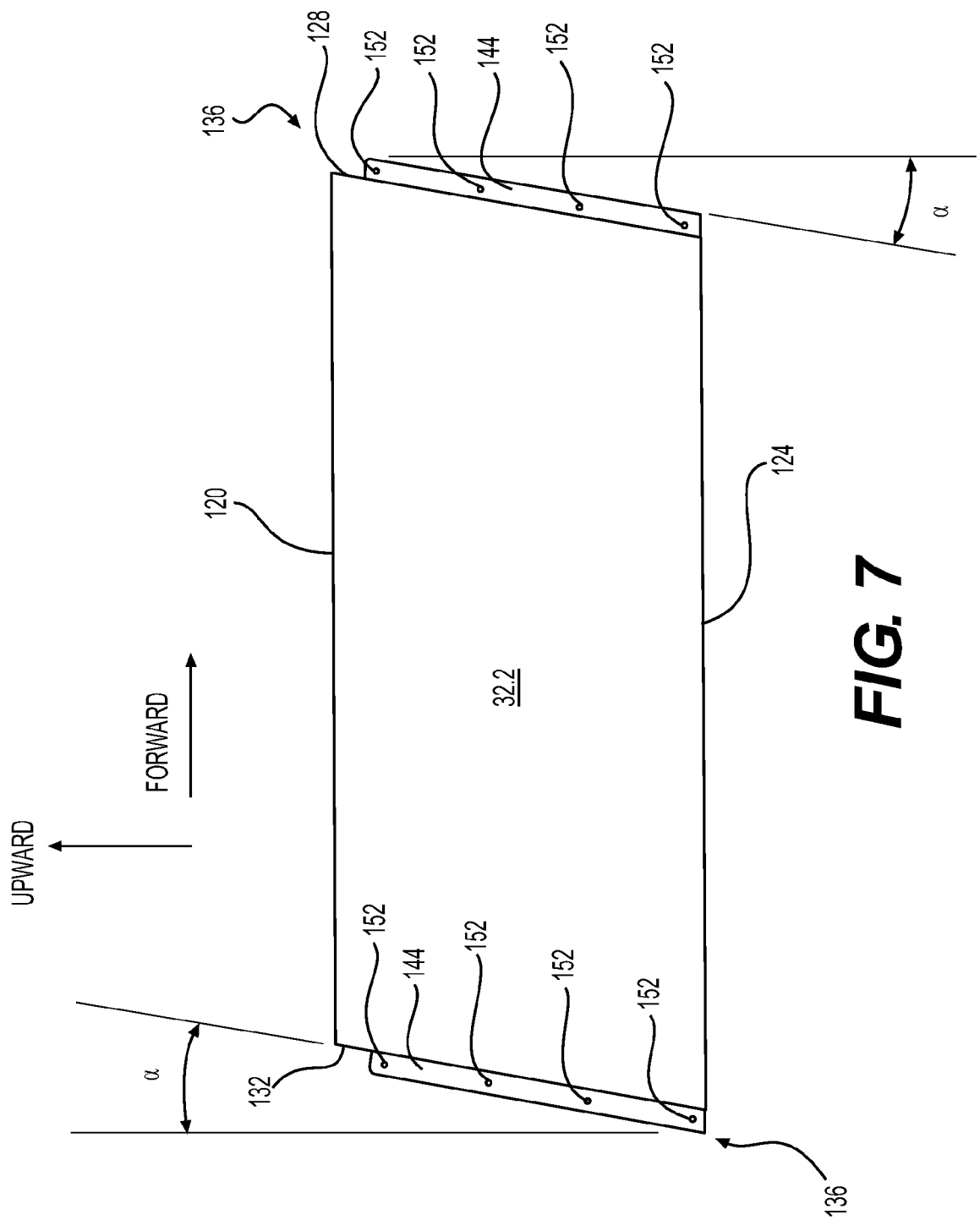
FIG. 7 is an elevational view of a skirt portion.
Figure 10:
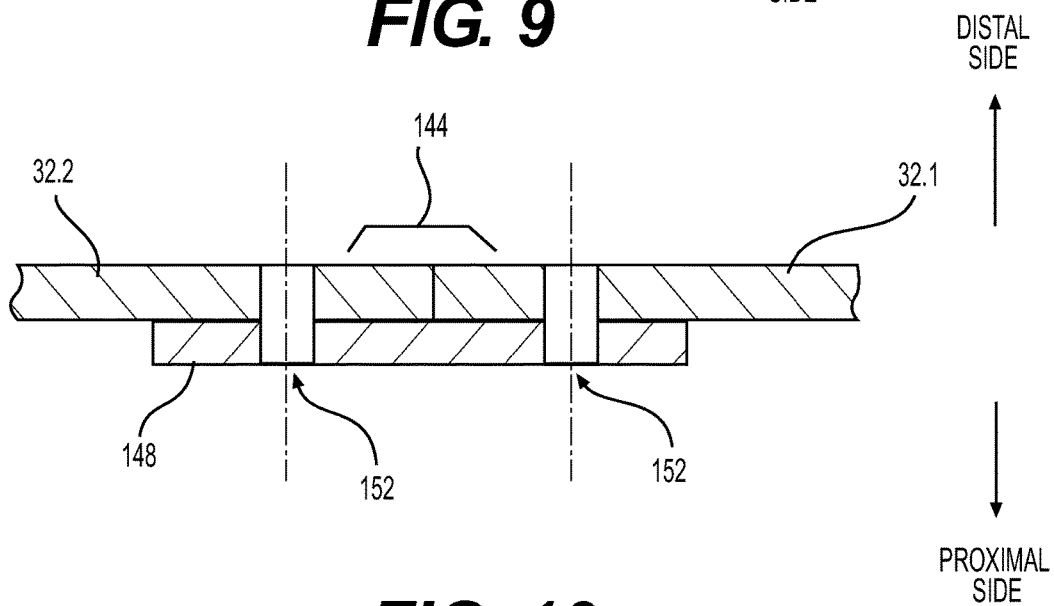
FIG. 10 is a section view of an interconnecting edge of a skirt portion.

The forward skirt portion 32.1 is assembled to the middle skirt portion 32.2 with a plurality of fasteners 116, like bolts, rivets or other means adapted to secure the skirt portions 32.1, 32.2, 32.3 together. The middle skirt portion 32.2 illustrated in FIG. 7 includes an upper edge 120, a bottom edge 124 a forward edge 128 and a rearward edge 132. The upper edge 120 and the bottom edge 124 are embodied parallel to one another. The forward edge 128 and the rearward edge 132 are interconnecting edges 136 configured to receive and secure thereto respectively the forward skirt portion 32.1 and the rear skirt portion 32.3. The two interconnecting edges 136 are located on the middle skirt portion 32.2 to restrict the complexity provided by the interconnecting edges 136 the panels 32.1, 32.2, 32.3 to a single panel portion 32.2. Each interconnecting edge 136 includes a recessed portion 140 adapted to secure thereon the cooperating edge of the adjacent skirt portion 32. The recessed portion can extend about 37 mm (~1.5") of flat section that is shaped directly in the middle skirt portion 32.2. The recessed portion 140 is proximally recessed of the equivalent of the thickness of the skirt 32 sheet material, which is illustratively of about 4.5 mm (~0.180"), to overlap and joint the adjacent skirt portions 32.1, 32.2, 32.3. This embodiment is illustrated in FIG. 9. Alternatively, an additional interconnecting part 148 can be used to secure together two adjacent skirt portions 32 (illustrated in FIG. 10). The additional interconnecting part 148 would then be secured on the proximal side of the two adjacent skirt portions 32. Both configurations are ensuring that the distal surface of the assembled skirt portions 32 is flush, at the same level 144, and facilitate the airflow thereon. The interconnecting edge 136 includes a plurality of holes 152 sized and designed to receive therein fasteners 116 to secure the assembly; e.g. 8 mm (~5/16") bolts.

Figure 8:
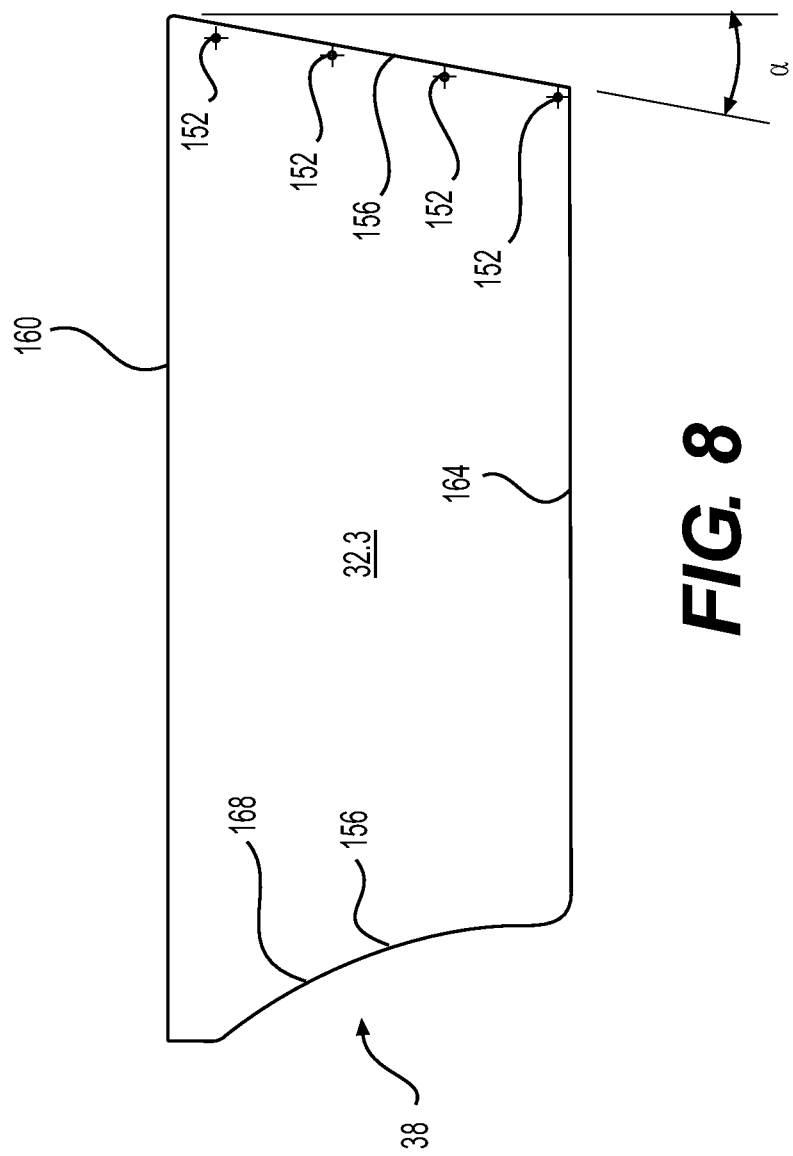
FIG. 8 is an elevational view of a skirt portion.

The rear portion 32.3 exemplified in FIG. 8 includes a forward edge 156, a rearward edge 168, an upper edge 160 and a bottom edge 164. In the present configuration, the forward edge 156 is configured to be assembled with the rear interconnecting edge 132, 136 of the middle skirt portion 32.2.

Figure 11:
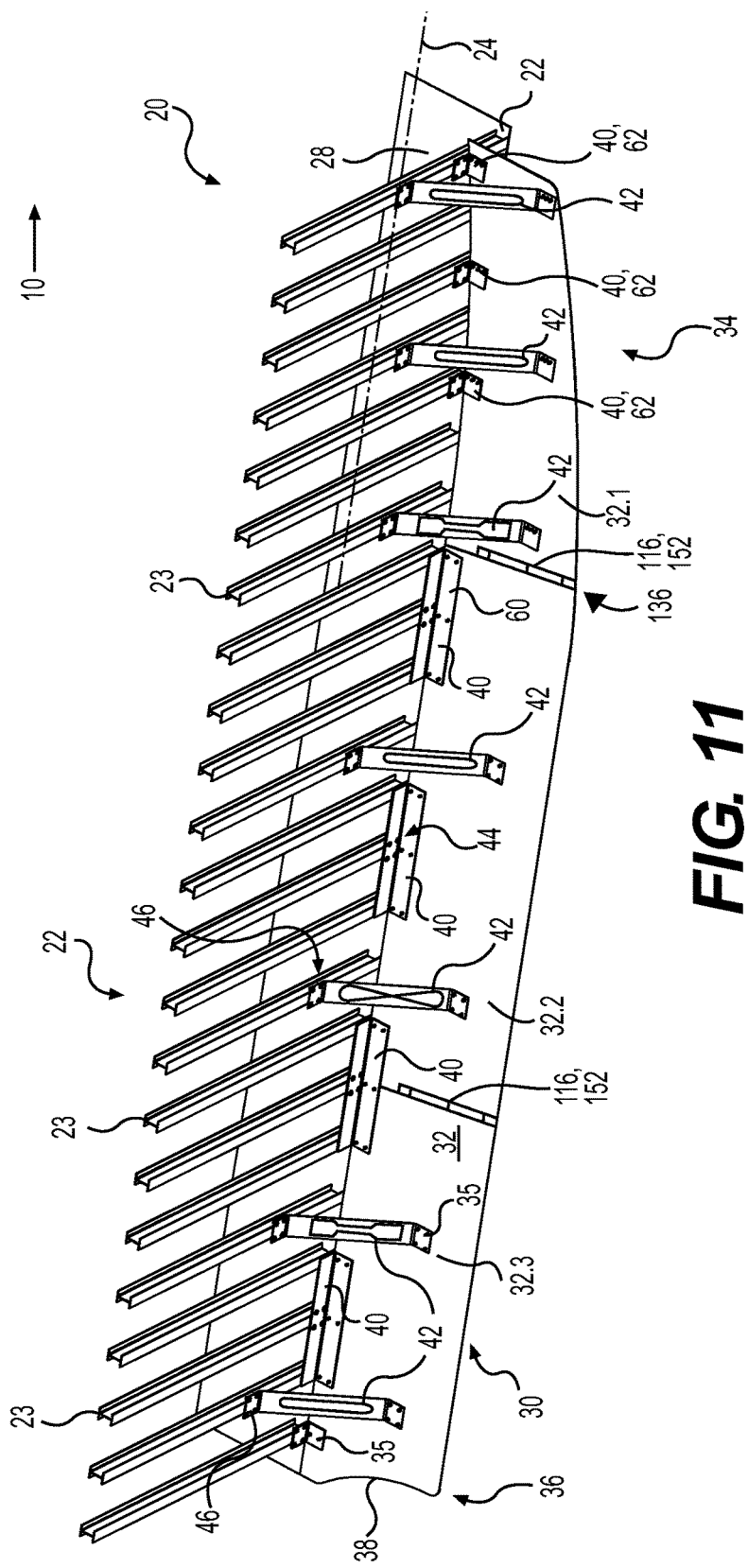
FIG. 11 is a bottom-right isometric view of a trailer's floor beams and a skirt assembly.

FIG. 11 is a perspective image of the skirt assembly 30 installed on the right side of a trailer 20 from which is only illustrated a series of frame members 23 forming a portion of the trailer floor frame 22. A series of support members 40 are secured to the trailer to secure the juxtaposed skirt panels 31 thereto. The support members 40 could be omitted altogether and the skirt panel could alternatively be attached directly to the trailer 20 without deviating from the scope of the present application. The rear portion of the skirt panel 31 is preferably positioned on the edge of the trailer's wall 28. It is also covered by the present invention that the skirt panel 31 could be installed a little in recess about the side of the trailer 20 to avoid winches, lights, toolbox or ladders located on the side/edge of the trailer 20. In contrast, it can be appreciated that the front skirt portion 32.1 of the skirt panel 31 is progressively positioned and secured toward the center 24 of the trailer 20. The skirt panel 31 is secured adjacent to the frame 22 with a series of support members 40 secured to both the frame members 23 and the skirt panel 31. Lower, the skirt panel 31 is secured to the trailer 20 with a series of intervening resilient struts 42 also secured to both the frame members 23 and the skirt panel 31. Additional details about the support members 40 and the resilient struts 42 are provided later in reference with other Figures.

Still referring to FIG. 11, it can be appreciated that the upper series of holes 35 disposed on a top portion of the skirt panel 31 is used to fasten the skirt panel 31 to respective support members 40 that, themselves, are secured to frame members 23 of the trailer 20. A number of connection points between the skirt panel 31 and the trailer 20 are used to ensure the skirt panel 31 is well secured to the trailer 20 and will not vibrate or deflect (however some deflection can be acceptable under certain conditions) during operation. The series of holes 35 disposed on a lower portion of the skirt panel 31 are adapted to attach to an end of each resilient strut 42. Similarly, with this configuration of struts 42, the other end of the resilient strut 42 is connected to the frame members 23 of the trailer 20 via a fastener mechanism that will be discussed below in details.

Figure 15:
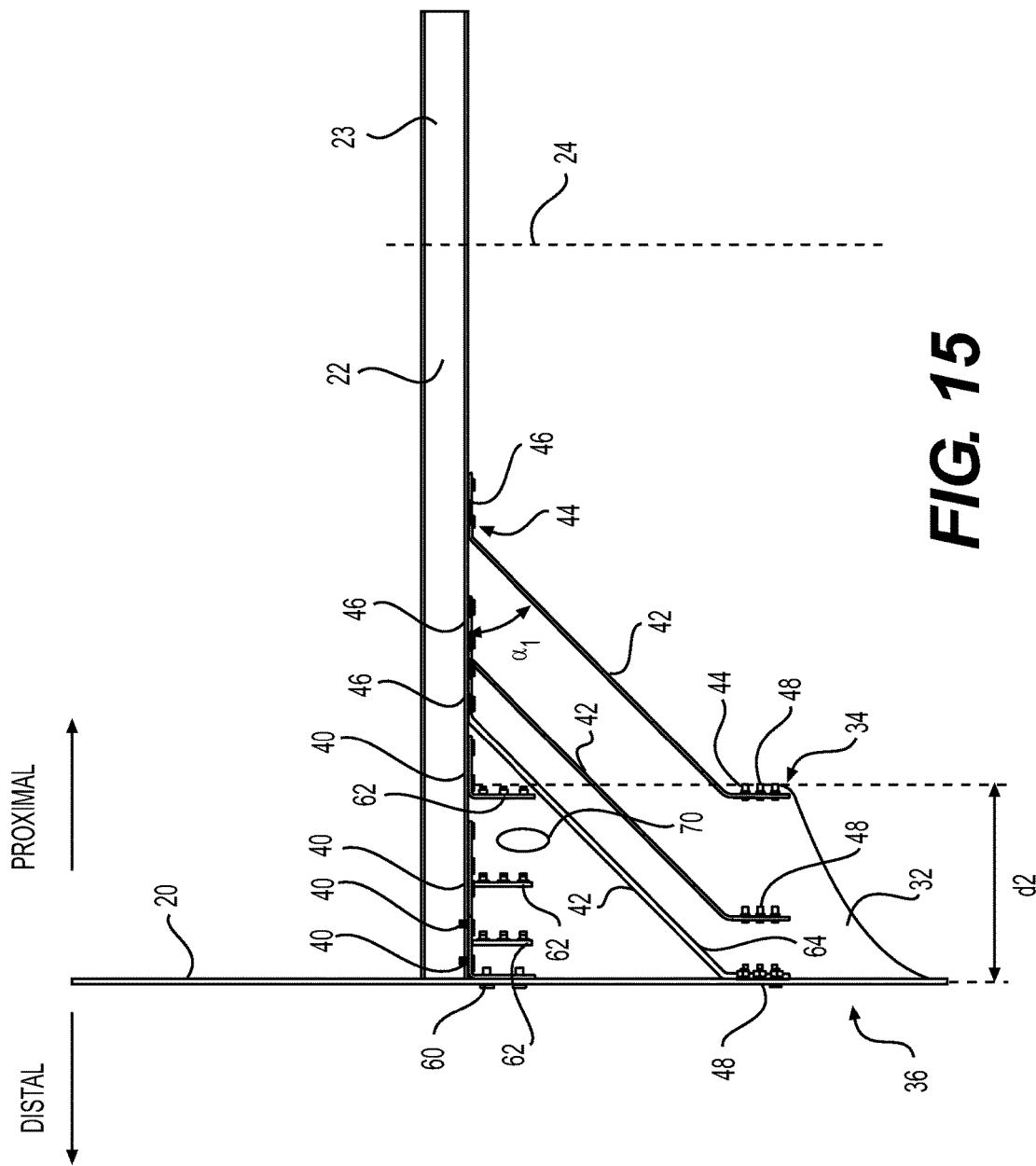
FIG. 15 is a rear elevational view of a skirt assembly secured to a trailer floor.

FIG. 12 throughout FIG. 15 are additional views of the skirt assembly 30. It can be further appreciated that a curved portion 38 is defined on the rear portion 36 of the skirt panel 31 and preferably corresponds to the exterior shape of the adjacent wheels 26 of the trailer 20. In so doing, it is possible to install the skirt panel 31 close to the wheels 26 without risking any contact thereto. It is preferable to leave a distance between the wheels 26 of the trailer 20 and the skirt panel 31 to avoid any risk of interference therebetween.

The wheels 26 of a trailer 20 are commonly adapted to be longitudinally adjustable to distribute the mass of the trailer 20 in a desired fashion. The adjustment of the position of the axels of a trailer 20 is desirable, for instance, when a heavy load is carried or during thaw and freeze periods. In this respect, and to avoid reinstalling the skirt panel 31 in various positions on the trailer 20, it might be desirable to install the skirt panel 31 in respect with the forwardmost possible position of the axels of the trailer 20. That would prevent to remove and reposition the skirt panel 31 when the trolley's 16 position is modified.

The trailer wheels 26 are mounted on a trailer buggy 16 adapted to move the wheels 26 along a portion of the trailer's length to distribute the weight of the trailer 20 in a desired fashion. The skirt assembly 30 is preferably permanently secured to the trailer 20 taking in consideration the forwardmost position of the trailer buggy 16. The gap between the skirt panel 31 and the trailer's wheels 26 is however increased when the trailer buggy 16 is move toward the rear of the trailer 20 thus likely reducing the aerodynamic efficiency of the skirt assembly 30. The present invention provides a skirt panel extension module 33 adapted to reduce the gap between the skirt panel 31 and the trailer's wheels 26 to prevent any aerodynamic efficiency reduction. The skirt panel extension modules 33 are secured to the trailer in a similar fashion. The skirt panel extension module 33 can be provided in various lengths to fill gaps of various sizes. They can also be provided as skirt panel extension modules 33 kit. An alternate embodiment provides a sliding skirt panel extension 33 that is permanently secured to the trailer 20 and extendable to the desired length when the trailer buggy 16 is moved.

Figure 16:
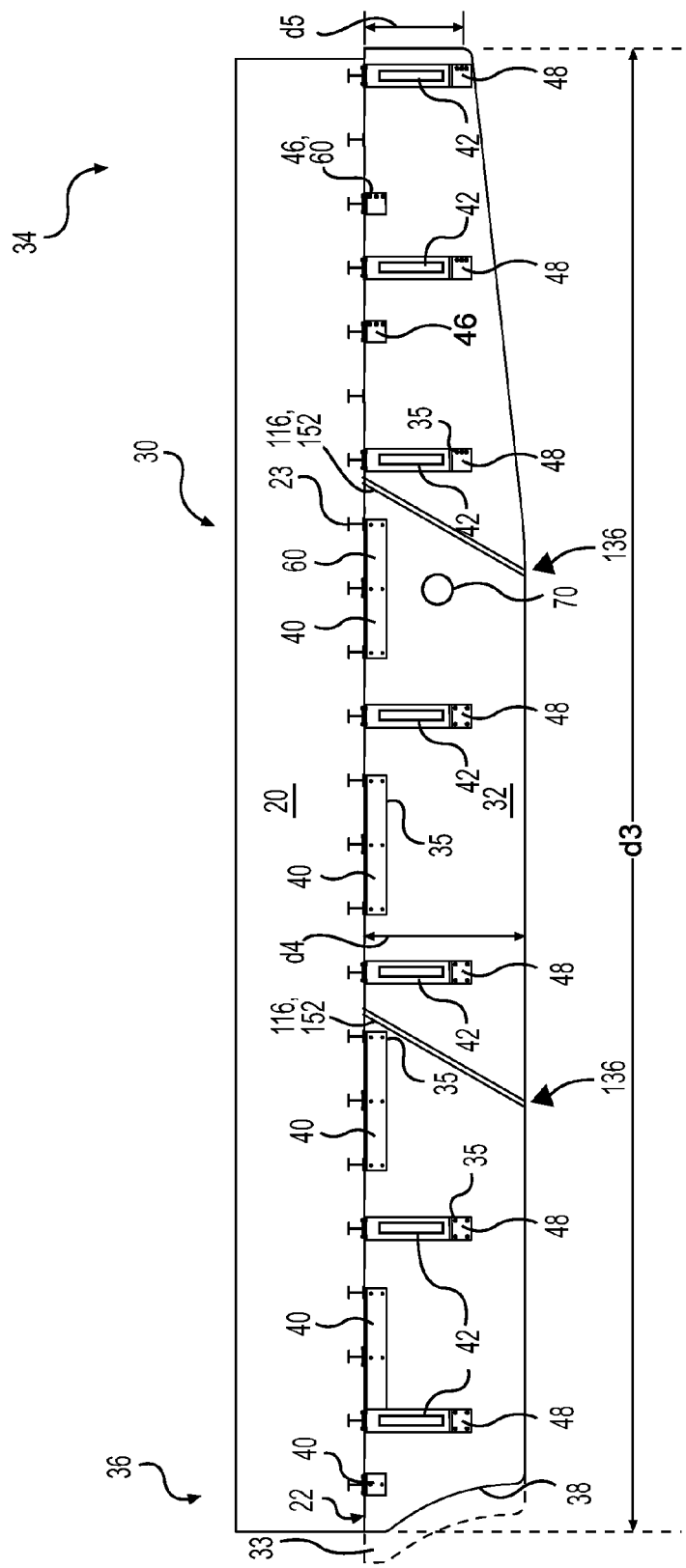
FIG. 16 is a right elevational view of a skirt assembly.

A skirt panel extension 33, illustrated on FIG. 16, can alternatively be added between the skirt panel 31 and the wheels 26 when the axles of the trailer 20 are located in a rearward position leaving an increased distance therebetween to improve the aerodynamic efficiency of the skirt assembly 30. A reasonable distance between the skirt panel 31 and the wheels 26 could be between about 15 centimeters and about 30 centimeters although a shorter distance, or even a superposition of the skirt panel 31 (or skirt panel module(s) 33) over the wheel 26, can be achieved.

Figure 17:
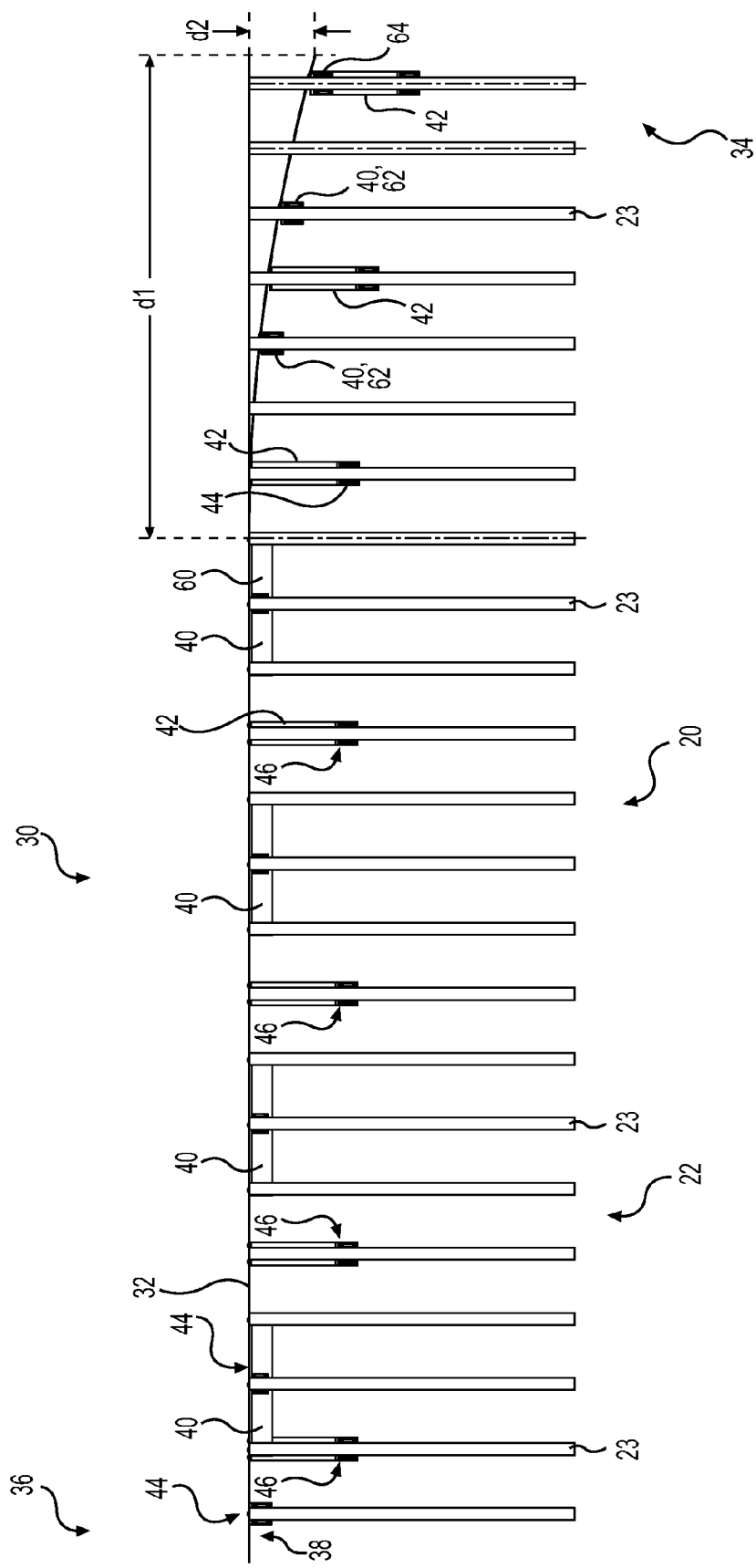
FIG. 17 is a top plan view of a skirt assembly secured on beams of a trailer floor.

FIG. 17 is a top elevation view of the trailer frame 22. As mentioned above, it can be appreciated from FIG. 17 that the skirt panel 31 is disposed inwardly on the forward portion of the trailer 20 and is progressively located on the edge of the trailer's wall 28 toward the rear end of the trailer 20. A departure support member 60 and a cooperating forward support member 64 are secured to the trailer to correctly locate the skirt panel 31 on the trailer 20. The departure support member 60 and the forward resilient strut 64 are installed on the trailer 20 prior to install the skirt panel 31. The rear portion 36 of the skirt panel 31 is secured to the trailer 20 up to the departure support member 60 and then the skirt panel 31 is bent to reach the forward support member 64 and secured thereto. That bent locates the skirt panel 31 to the trailer 20 and defines the shape of the skirt panel 31 with the desired progressive proximal bent. The remaining support members 62 and resilient struts 42 are installed thereafter to further secure the assembly.

The rear portion 36 of the skirt panel 31 is intended to be secured to the trailer to leave only a minimum gap with the trailer wheels 26 to improve the aerodynamic efficiency of the skirt assembly 30. The skirt panel 31 extends to the front of the trailer 20 and includes a curved portion on its front portion 34. A long skirt panel 31 appears to be more efficient than a shorter skirt panel 31 and should therefore extend as far as possible to the front of the trailer 20. However, for reasons of complexity, the front portion 34 of the skirt panel 31 is likely to stop at the trailer supports 14. It is nonetheless encompassed by the present invention that the skirt panel 31 alternatively extends in front of the trailer supports 14. The lowermost portion of the front portion 34 of the forward skirt panel 31.1 is provided with a radius thereof as it is best seen in FIG. 16.

In an embodiment of the invention adapted to fit a standard 16.1 meters (~53 feet) long trailer 20 the forward end of the departure support member 60 is located at a distance $d_1$ from the forward end of the skirt panel 31. A forward support member 64 is secured to the frame at a distance $d_2$ from the side edge of the trailer 20 as it can be appreciated in FIG. 16 and FIG. 17. Distance $d_1$ is about between 1.5 meter and 3 meters, preferably about between 2 meters and 2.5 meters and most preferably about between 2.1 meters and 2.4 meters. Distance $d_2$ is about between 0.20 meter and 0.40 meter, preferably about between 0.25 meter and 0.35 meter and most preferably about 0.27 meter and 0.32 meters. More precisely, distance $d_1$ is preferably about 2.29 meters and distance $d_2$ is preferably about 0.31 meter in a preferred embodiment. Corresponding support members 40 and resilient struts 42 are installed to further secure the skirt panel 31 at the desired position.

A right side elevation view schematically illustrating, on FIG. 16, the overall size of the skirt panel 31. Length $d_3$ of the skirt panel 31 is about between 5 meters and 9 meters, preferably about between 6 meters and 8 meters and most preferably about between 5.8 meters and 7.5 meters. The height $d_4$ of the skirt panel 31 is about between 0.5 meter and 1 meter, preferably about between 0.6 meter and 0.9 meter and most preferably about between 0.7 meter and 0.9 meter. And the forwardmost height $d_5$ of the skirt panel 31 is about between 0.3 meter and 0.7 meter, preferably about between 0.4 meter and 0.6 meter and most preferably about between 0.45 meter and 0.5 meter. More precisely, distance $d_4$ is preferably about 0.81 meter and distance $d_5$ is preferably about 0.48 meter in a preferred embodiment.

Alternate embodiments providing a skirt assembly 30 sized and designed to fit trailers 20 of different lengths can be inferred from the dimensions discussed above. For instance, a skirt assembly 30 can be designed to fit a 14.6 meters (~48 feet) trailer 20 or any other trailer 20 sizes and lengths.

In one embodiment, the skirt panel 31 is made of composite material. Recommended multilayer composite material, fiber reinforced polypropylene, a combination of a polypropylene component and woven component or unidirectional thermoplastic manufactured by Transtex Composites Inc. is used in the present embodiment. The composite material forming the skirt panel 31 of the illustrative example is shaped in a planar material adapted to allow skirt panel 31 to bend when the skirt panel 31 is pushed toward the center of the trailer 20 (proximally) when, for instance, contacting an obstacle or having a force applied thereon. The skirt panel 31 bends, allowing a significant displacement of the bottom portion of the skirt panel 31 proximally and distally from a longitudinal centerline of the trailer 20, and is adapted to retrieve by itself its original position when the force is removed from the skirt panel 31. As further illustrated in FIG. 16, the skirt panel 31 is provided with a series of holes 35 therein used to connect the skirt panel 31 to the support members 40, 42 and 46. The series of holes 35 disposed on the upper portion of the skirt panel 31 is used to connect the skirt panel 31 to the frame 22 of the trailer 20 whereas, in a similar fashion, the series of holes 35 disposed on the bottom portion of the skirt panel 31 is used to connect the skirt panel 31 to the skirt connecting portion 48 of the resilient strut 42. The resilient strut 42 is connected to the frame member 23 of the trailer via the trailer-connecting portion 46 of the resilient strut 42. The skirt connecting portion 48 and the trailer-connecting portion 46 include respective series of holes 35 to receive fasteners therein. The holes 35 can be factory pre-drilled or can be drilled during installation to ensure desired customization. Rivets or bolts are placed in the holes 35 to secure the skirt panel 31 to the trailer frame 22 or the support assembly. Other appropriate fastening mechanism variations well known in the art are encompassed by the present disclosure and can be used without departing from the scope of the invention.

An opening 70 is defined in the skirt panel 31 to allow access to an optional fuel tank disposed on the trailer 20 to fuel an onboard generator or freezer. Such a fuel tank is commonly disposed under the floor 22 of the trailer 20 and is most likely hidden by the skirt assembly 30. The opening is sized, designed and located on the skirt panel 31 to allow access to the fuel tank. A door (not illustrated) can optionally be added to close the opening 70.

Turning now again to FIG. 15 where is illustrated a plurality of resilient struts 42 and angles support 40 secured between the frame 22 and the skirt panel 31. The rear elevation view shows that the front portion 34 of the skirt panel 31 is proximally recessed from the left lateral side of the trailer 20 by, illustratively, about 30 centimeters. It can also be appreciated that the skirt panel 31 is held to the trailer frame 22 via the series of angled support 40 on its upper portion. The trailer connecting portion 46 of the resilient strut 42 is connected to the frame member 23 at an angle $\alpha_1$, which is an angle of about 45° in the present illustrative embodiment and could be different without departing from the present description.

Figure 18:
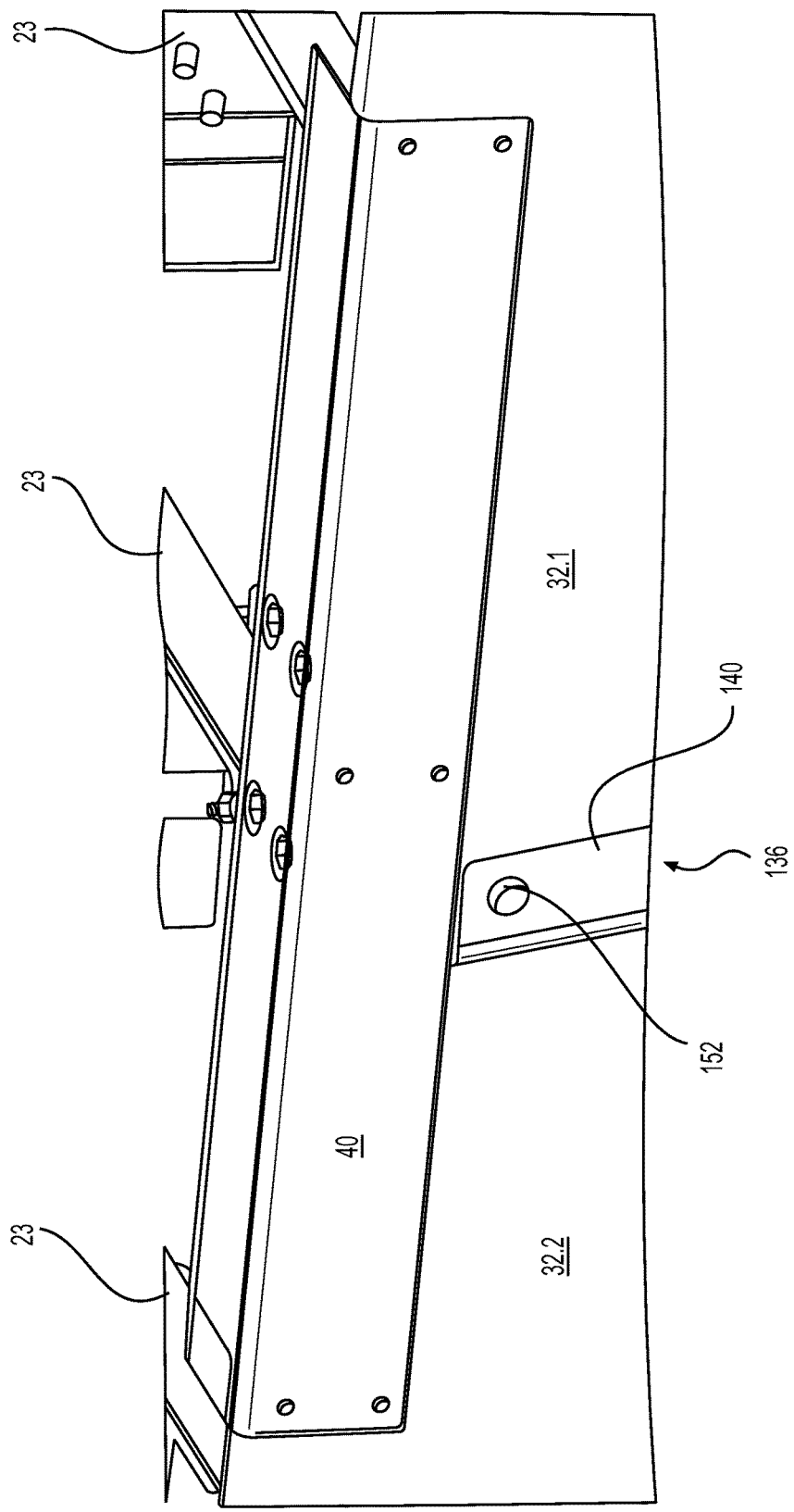
FIG. 18 is a magnified portion of an isometric view of a support member secured to a beam of a trailer floor.
Figure 19:
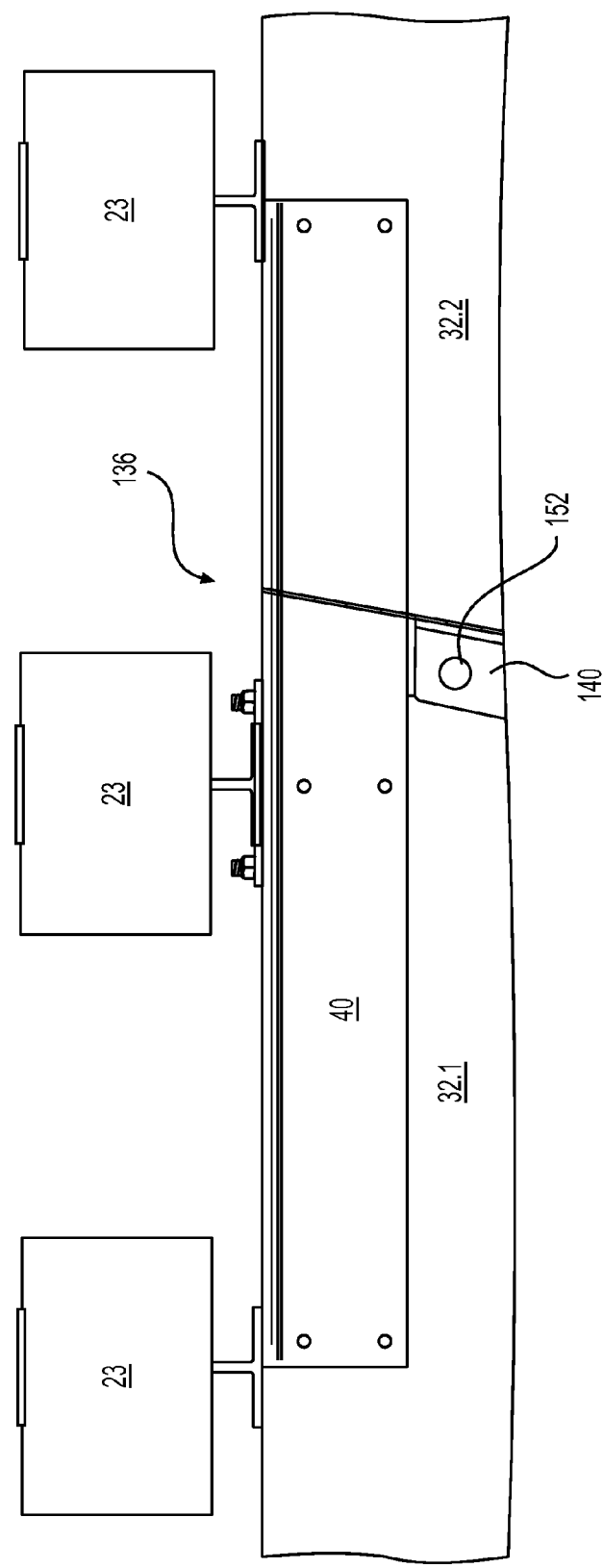
FIG. 19 is a side elevational view of a support member secured to a beam of a trailer floor.

FIG. 18 and FIG. 19 are illustrating a close up view of the connection between the skirt portions 32 and the trailer frame members 23 via support members 40. It can be appreciated that the recessed portion 140 of the skirt portion 32.2 is shorter at the top to allow the support member 40 to be in contact with the skirt portions 32 all along its length.

In one embodiment, the resilient strut 42 has a rectangular section and is made of composite material. Recommended multilayer composite material, polypropylene component, glass component, fiber reinforced polypropylene, a combination of a polypropylene component and woven component, or reinforced thermoplastic manufactured by Transtex Composites Inc. is used in the present embodiment. The composite material forming the resilient struts 42 of the illustrative example is shaped in a rectangular section to allow the resilient strut 42 to bend when the skirt panel 31 is pushed toward the center of the trailer 20 (proximally) when, for instance, contacting an obstacle or having a force applied thereon. The resilient strut 42 bends, allowing a significant displacement of the bottom portion of the skirt panel 31, is adapted to self-retrieve its original position when the force is removed from the skirt panel 31. The resilient strut 42 is preferably made of a one-piece material where both ends are slightly angled 44 to evenly contact the skirt panel 31 and the trailer frame member 23. In so doing, no additional intervening parts are required between the resilient strut 42 and both the skirt panel 31 and the trailer frame member 23.

Figure 20:
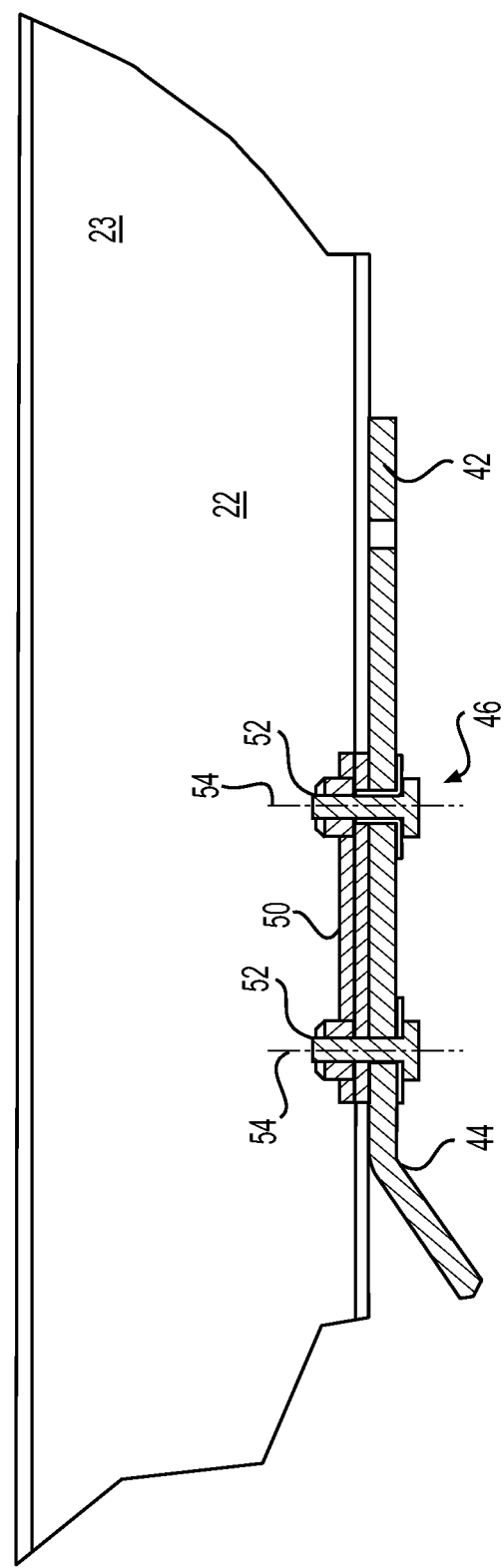
FIG. 20 is a section view of a connection mechanism securing a resilient strut to a trailer floor beam.
Figure 21:
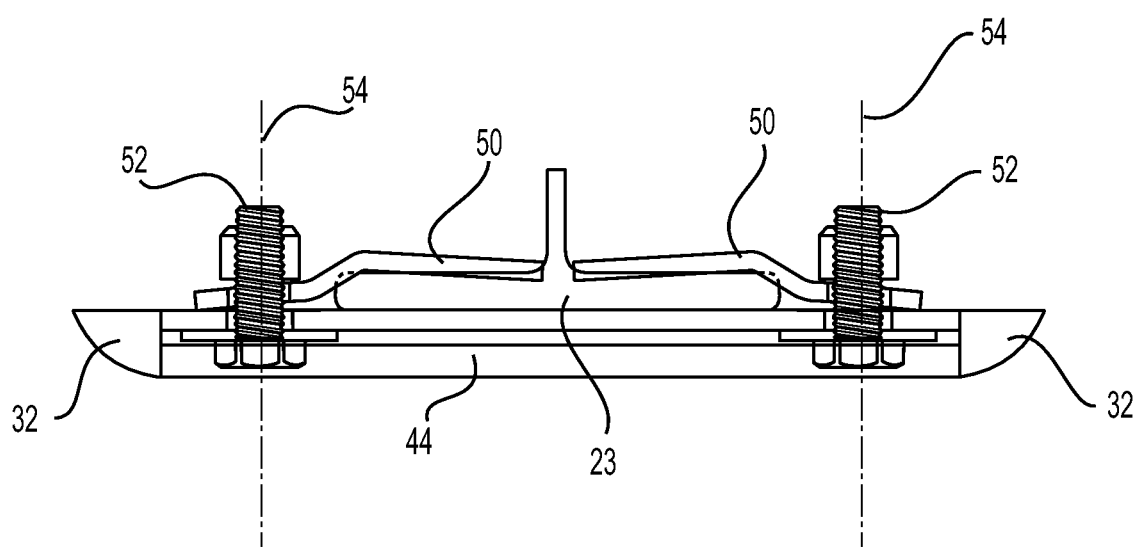
FIG. 21 is a section view of a connection mechanism securing a resilient strut to a trailer floor beam.

FIG. 20 and FIG. 21 depict with more details the connection mechanism between the resilient struts 42 and the trailer frame members 23. One of the resilient strut 42 ends is juxtaposed on the lower surface of the trailer frame 22. A set of holes, identified with holes axes 54, are used to fasten two clamps 50, one on each side of the frame member 23 with fasteners 52, to secure the resilient strut 42 to the trailer frame 22. The clamps 50 can be designed such that they are elastically deforming to secure the frame member 23 and are illustratively made of a shaped stainless steel plate material to prevent corrosion.

Figure 22:
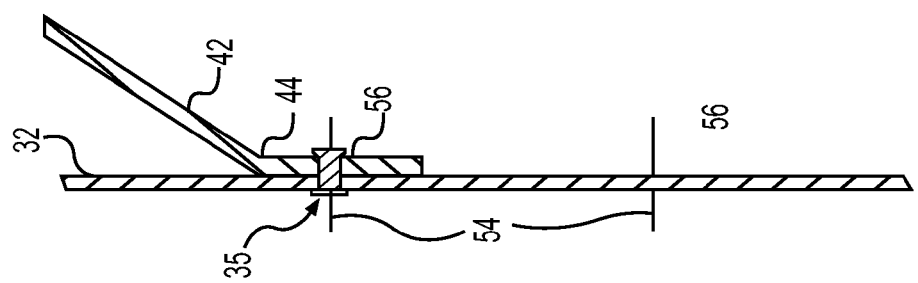
FIG. 22 is a section view of a connection mechanism securing a resilient strut to a skirt portion.

FIG. 22 illustrates the connection between the resilient strut 42 and the skirt panel 31. The end of the resilient strut 42 is positioned to the surface of the skirt panel 31 and secured thereto. Any types of fasteners 56 can be used to fasten both parts together. Rivets are preferably used to secure the assembly with the resilient strut 42 although a bolt could also fit into the holes performed in the skirt panel 31, identified with hole axis 54, to secure the assembly. Glue or resin could alternatively be applied between the resilient strut 42 and the skirt panel 31 to secure the resilient strut 42 and the skirt panel 31 together and is also encompassed by the present invention.

Figure 23:
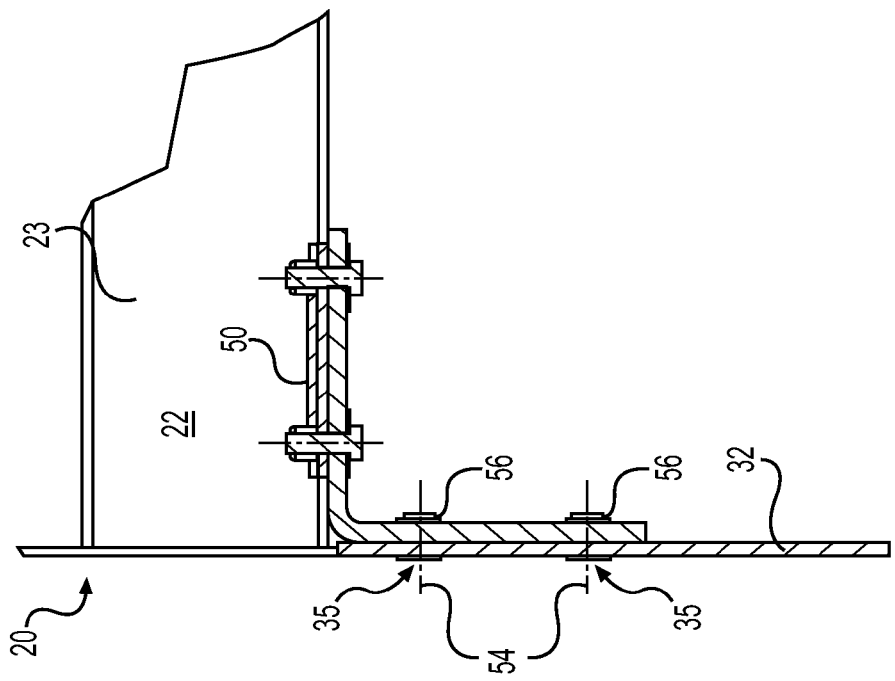
FIG. 23 is a section view of a connection mechanism securing a resilient strut to a skirt portion and a trailer floor beam.

FIG. 23 shows the assembly between the upper portion of the skirt panel 31 and one of the angled supports 40. The support member 40 is disposed next to the edge of the trailer 20 to position the exterior surface of the skirt panel 31 significantly co-planar with the lateral wall of the trailer 20. Again, any types of fasteners can be used to fasten both parts together. Rivets are preferably used but a bolt could also fit into the holes 54 in the skirt panel 31 and the angled support 40 to secure the assembly. Here again, glue or resin could alternatively be applied between the support member 40 and the skirt panel 31 to permanently secure the support member 40 and the skirt panel 31 together.

The resilient struts 42 of the present embodiment is about 4 millimeters thick and can reach a flexing radius of about 20 centimeters without reaching plastic deformation, or breaking. In some designs, the thinner the resilient strut 42 is, the shorter will be its maximum radius of curvature. A lateral proximal displacement of about 60 centimeters of the bottom portion of the skirt panel 31 is possible. The lower portion of the skirt panel 31 can even reach, under certain circumstances, a position parallel with the trailer 20 floor. The skirt assembly 30 and the skirt panel 31 will self-recover their original positions when the force causing the bending is removed. Further, the bending of the resilient struts 42 provides energy absorption in case of impact from another vehicle for example. It can be noted that a distal displacement of the skirt panel 31 is possible. A distal and proximal displacement of the skirt panel 31 will occur when a properly directed force is applied to the skirt panel 31 to bend the skirt panel 31.

Figure 25:
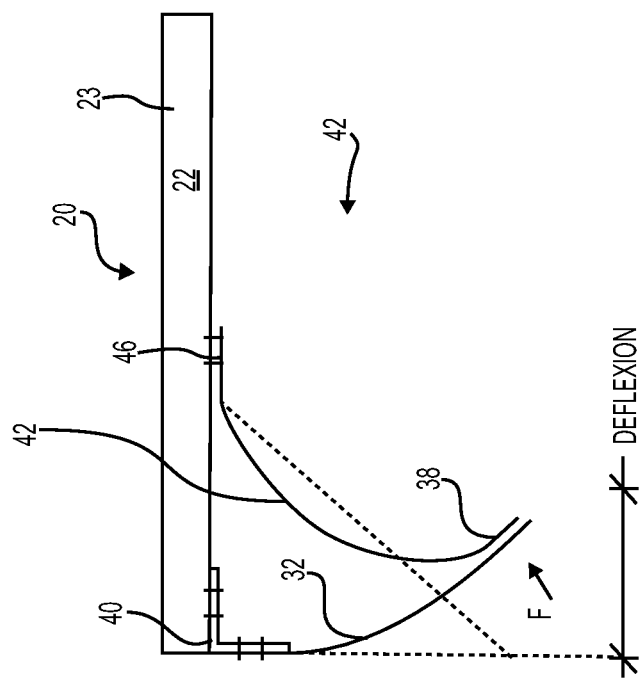
FIG. 25 is a schematic illustration of a resilient strut proximally bent away from the aerodynamic configuration.
Figure 24:
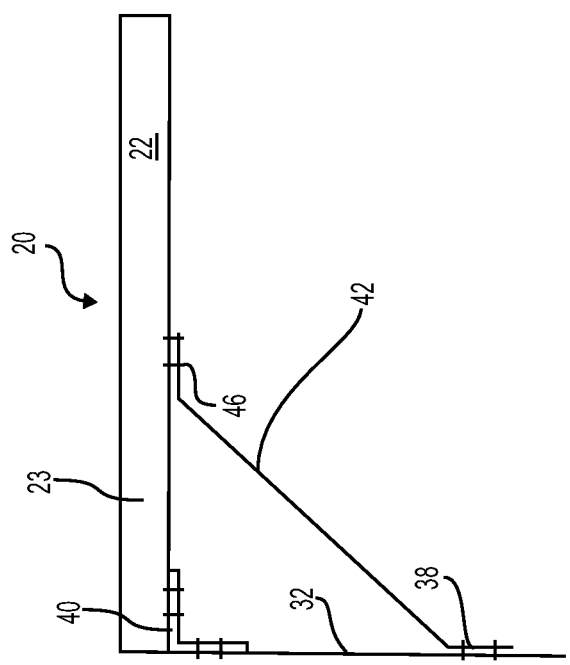
FIG. 24 is a schematic illustration of a resilient strut in the aerodynamic configuration.
Figure 27:
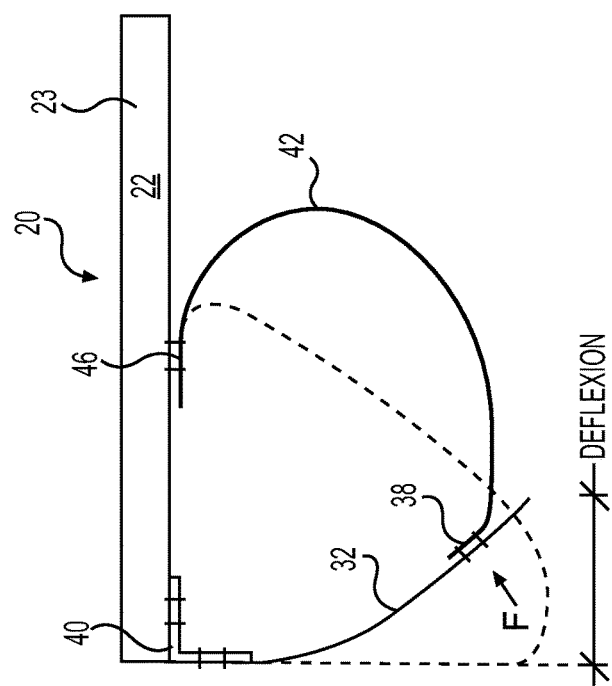
FIG. 27 is a schematic illustration of a resilient strut proximally bent away from the aerodynamic configuration.
Figure 26:
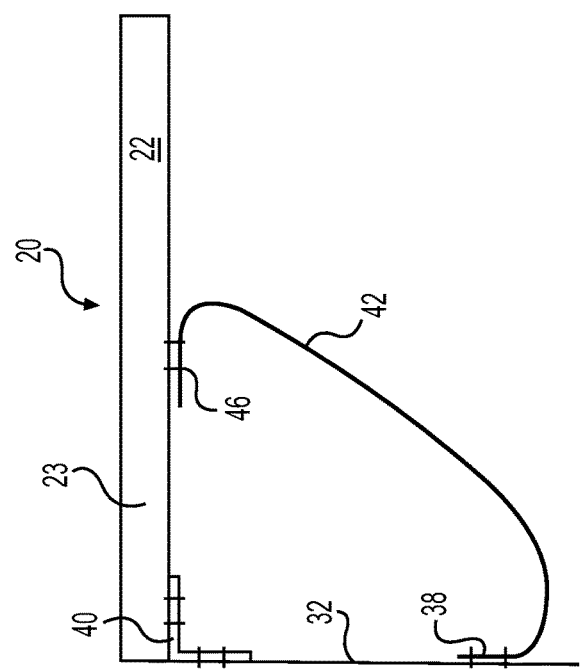
FIG. 26 is a schematic illustration of a resilient strut in the aerodynamic configuration.
Figure 29:
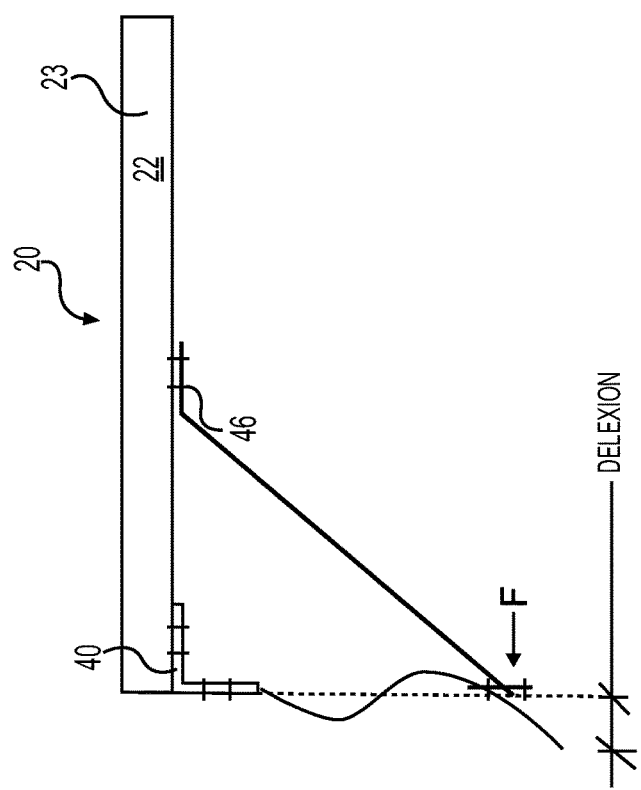
FIG. 29 is a schematic illustration of a resilient strut distally bent away from the aerodynamic configuration.
Figure 28:
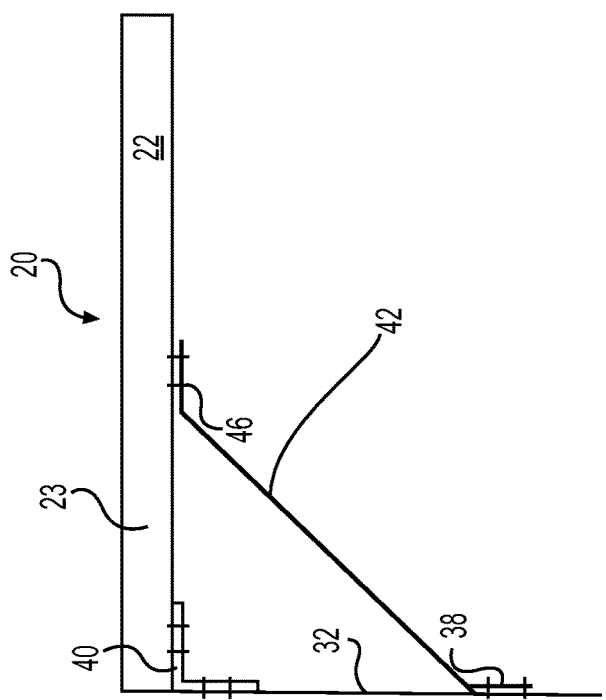
FIG. 28 is a schematic illustration of a resilient strut in the aerodynamic configuration.

FIG. 24 throughout FIG. 29 illustrate an embodiment where the resilient strut 42 is fixed to the trailer frame 22 and the skirt panel 31 in different possible configurations. A first configuration is illustrated in FIG. 24 and FIG. 25 illustrated with a force F proximally applied toward the vehicle. Instead of installing the resilient strut 42 with both ends slightly angled to mate with the skirt panel 31, FIG. 26 and FIG. 27 are illustrating a configuration where both ends of the resilient strut 42 are further angled to contact the skirt panel 31 from the opposite side. This alternate layout assembly reduces the stress on the resilient strut 42, when the skirt panel 31 is deflected, for instance, under a force F, by expending the radius of curvature of the resilient strut 42 throughout the resilient strut 42 ergo significantly reducing local stress points in the resilient strut 42. FIG. 28 and FIG. 29 are depicting the same resilient strut 42 configuration as in FIG. 24 and FIG. 25, this time with a force applied away, distally from the vehicle.

As would be appreciated by those skilled in the art, in view of the present specification, the nature of the material used to build the skirt panel 31 and the resilient strut 42 can vary. These materials are also contemplated to fall within the scope of the invention if they lead to the flexibility and resilience required to build a resilient skirt assembly 30.

Figure 30:
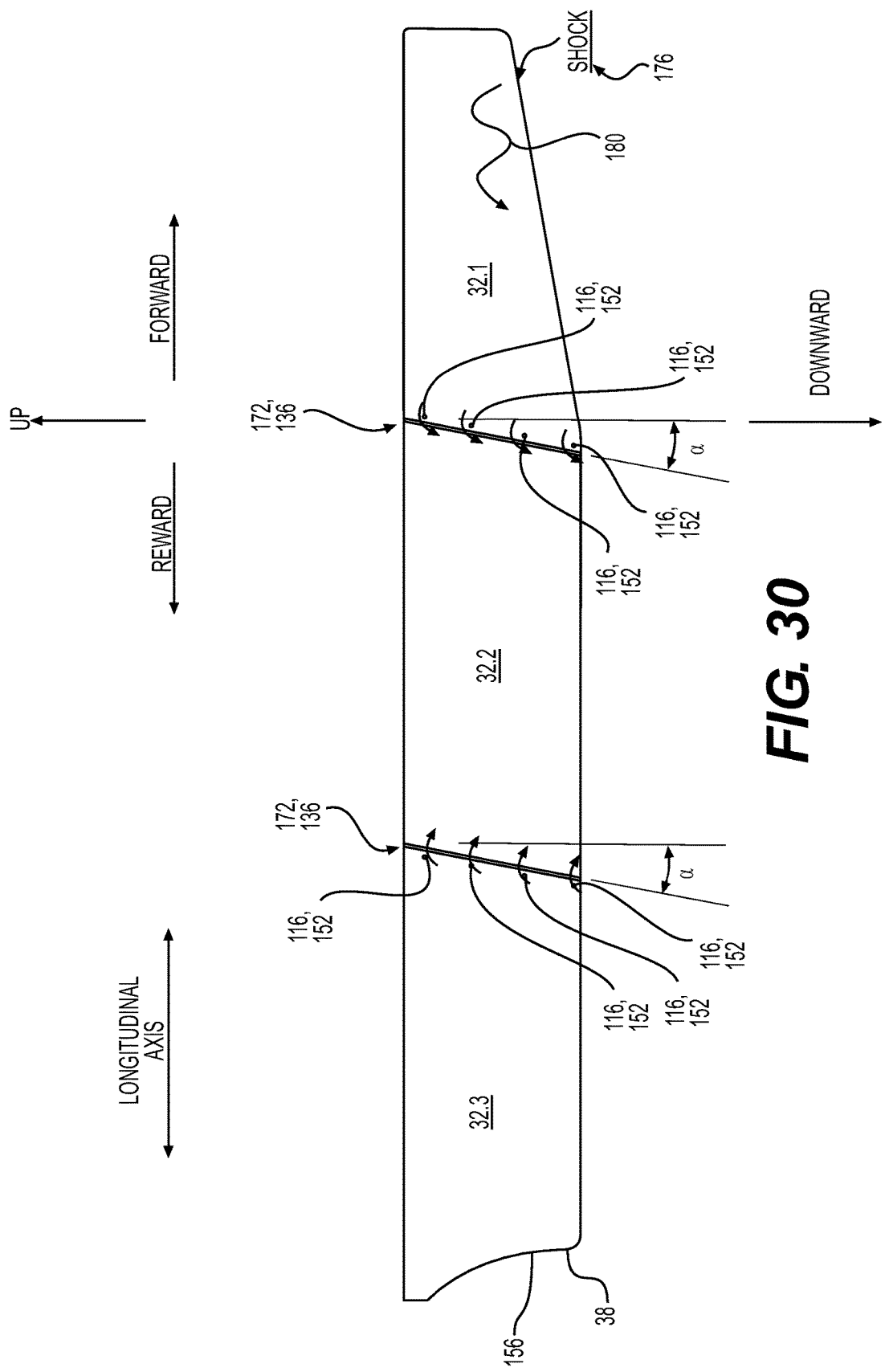
FIG. 30 is a side elevational view of a skirt panels assembly joined with an angled interconnecting edge.

FIG. 30 illustrate a skirt panel 31 including three (3) skirt panel portions 32.1, 32.2, 32.3. The interconnecting edges 136 between adjacent skirt portions 32.1, 32.2, 32.3 is not located at 90° from the upper and lower edges of the skirt panel 31, in other words the interconnecting edges 136 are not vertical when the skirt panel 31 is mounted on a trailer 20. The interconnecting edges 136 are rather disposed at an angle α from vertical to allow progressive mechanical stress transmission between adjacent skirt portions 32. The mechanical stress can be pictured as a "wave" transmitted in the skirt panel 31 that is caused by a contact with an external object with the front portion of the skirt panel 31. Generally, the more significant the angle α is, more progressive is going to be the mechanical stress transmission along the skirt panel 31 between adjacent skirt portions 32. For practical and economical reasons, like manufacturing limitations and waste, and shipping size, the angle α is not too large and could be selected among the following values:

TABLE 1

|  | Minimum angle α | Maximum angle α |
|---|---|---|
| Range A | 0° | 45° |
| Range B | 2° | 30° |
| Range C | 5° | 15° |
| Range D | 7.5° | 12.5° |
| Range E | 9° | 11° |

All the above ranges are considered to be within the scope of the preferred possible embodiments. Range A, range B and range C are contemplated although their respective range include pronounced angles and an angle of, for example 45°, would smoothly distribute the mechanical stress between the skirt portions 32.1, 32.2, 32.3 but would produce skirt portions 32.1, 32.2, 32.3 that are longer than a more reduced angle α. Manufacturing acute angles with materials contemplated for constructing the skirt panel 31 could be more challenging, more expansive, could increase the amount of defective parts and increase the risk of injury with sharp edges, as well as increasing waste. Shipping package is consequently going to be larger and thus, costlier. For at least some of these reasons, the angle α of about 10° is going to be considered as a typical angle offering a functional stress distribution while keeping the longitudinal length of the skirt portions 32 to a minimum. The angle α of about 10° is going to be used below for the purpose of the description although it is not intended to limit the range of the angle α for the described invention.

Figure 31:
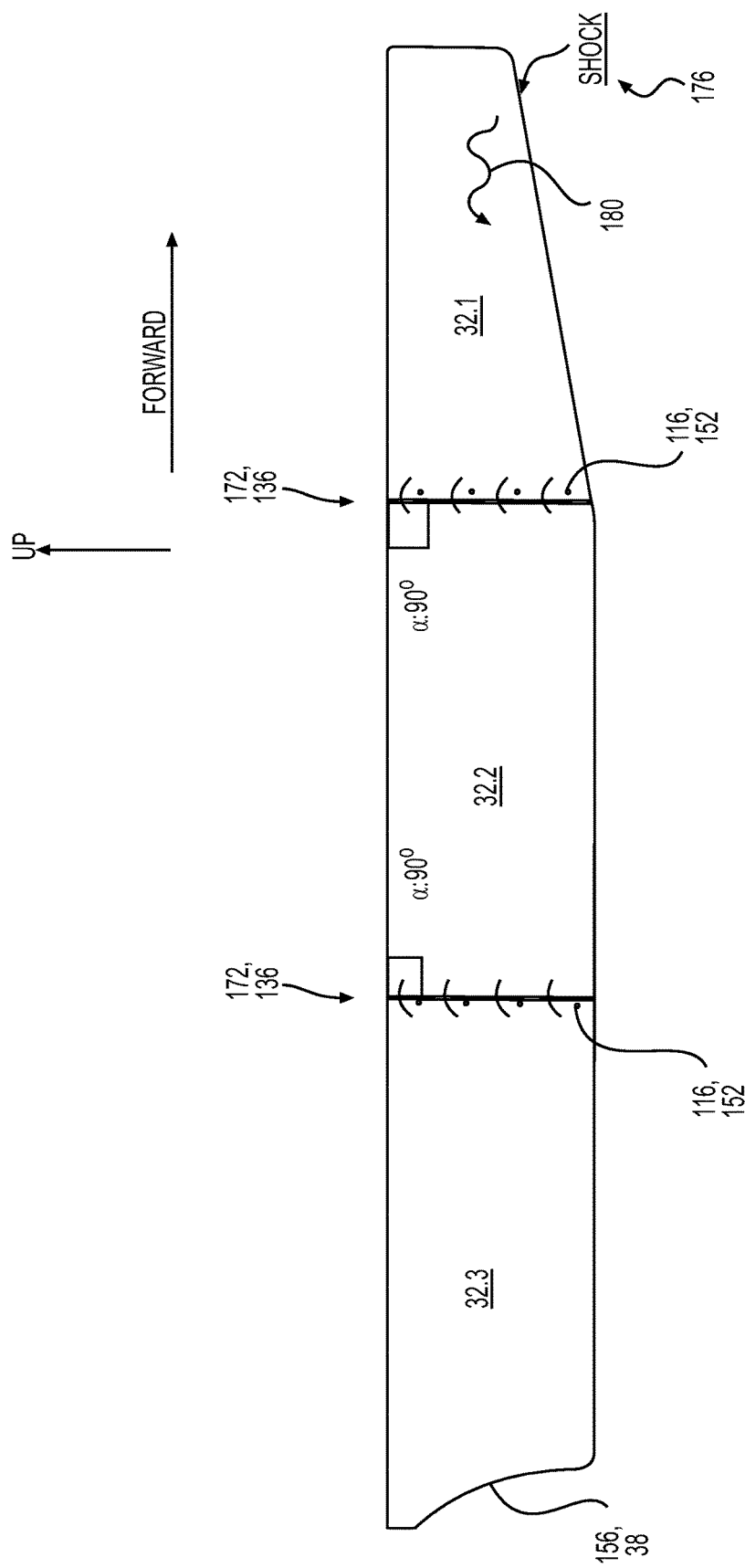
FIG. 31 is a side elevational view of a skirt panels assembly joined with a straight vertical interconnecting edge.
Figure 32:
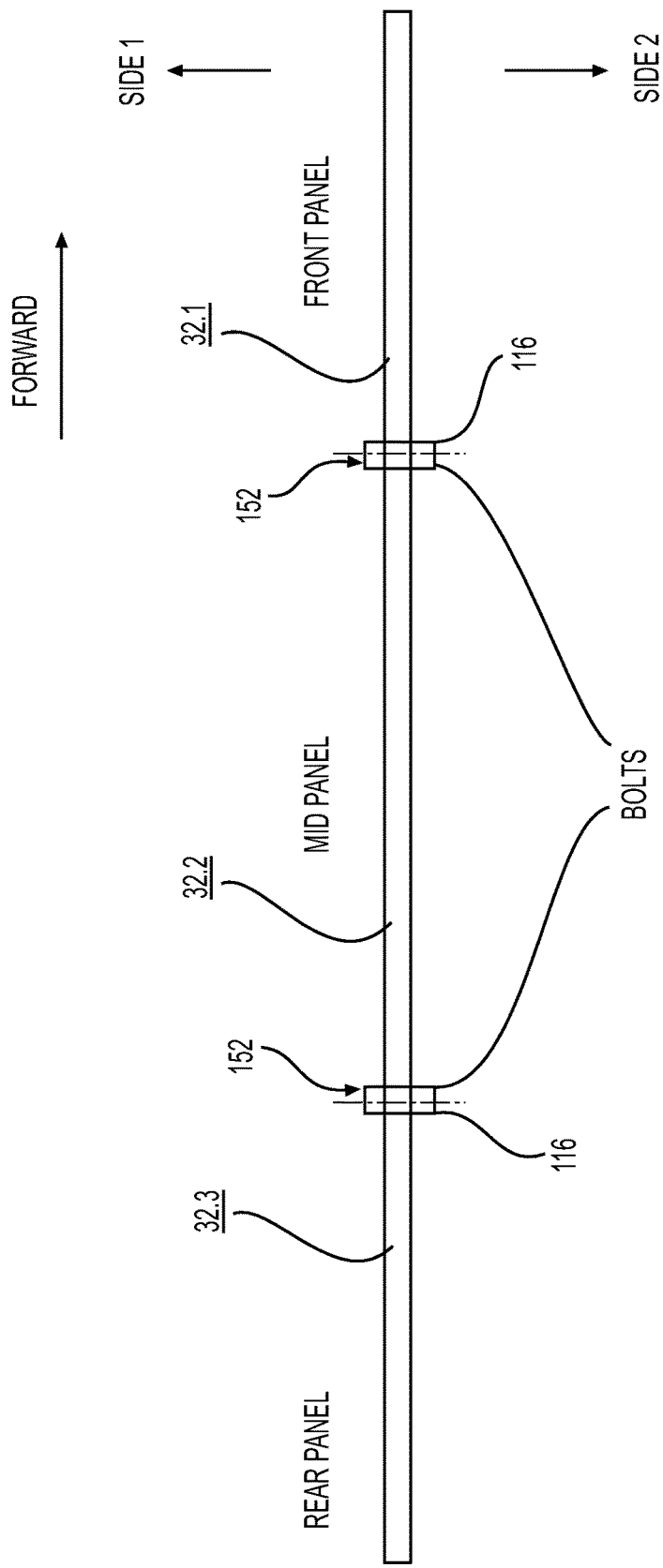
FIG. 32 is a top plan view of a skirt panels assembly.

Still referring to FIG. 30, a typical cut joint 172 having an angle α, from vertical, of about 10° is illustrated as opposed to a straight 90° vertical cut joint, as illustrated in FIG. 31. Still referring to FIG. 30, a foreign object getting in contact with the skirt portion 32.1 and causing a shock 176 is going to produce a wave 180 of energy traveling in the skirt 32, for instance, in the longitudinal direction toward the rear of the skirt panel 31. The wave 180 motion traveling in the skirt panel 31 toward the back and is progressively transferred to the second adjacent skirt portion 32.2, and then the third adjacent skirt portion 32.3. The progressive transfer of the energy carried by the wave 180 is permitted by the longitudinally progressive interconnecting edge 136 that is at angle α. The wave 180 is going to hit the upper portion of the interconnecting edge 136 before the lower portion of the interconnecting edge 136. Conversely, the wave 180 motion would not be progressively transferred should the angle α be a straight 90° vertical cut joint because the wave 180 would hit the straight 90° vertical cut joint all at the same time over the height of the skirt panel 31, as illustrated in FIG. 31. For more details, the skirt panel 31 is seen from a bottom view in FIG. 32. Each skirt portion 32.1, 32.2, 32.3 is joint with its adjacent skirt portion 32 with fasteners 116 through holes 152 therein at the interconnecting edge 136. The fasteners 116 contemplated in the embodiments could be bolts and nuts, rivets, glue or other types of welding or material fusing. Further simplifying and representing only the center skirt portion 32.2 in FIG. 33 with two interconnecting edges 136, one on each end thereof with shear and bending moment distribution along the skirt portion 32.2. Put differently, rotational stiffness is increased with an angle α that is not 90° because of the more significant bending moment that is required to bend it. The longer the interconnecting edges 136 are, the higher the bending moment is, hence increasing the rotational stiffness.

Figure 33:
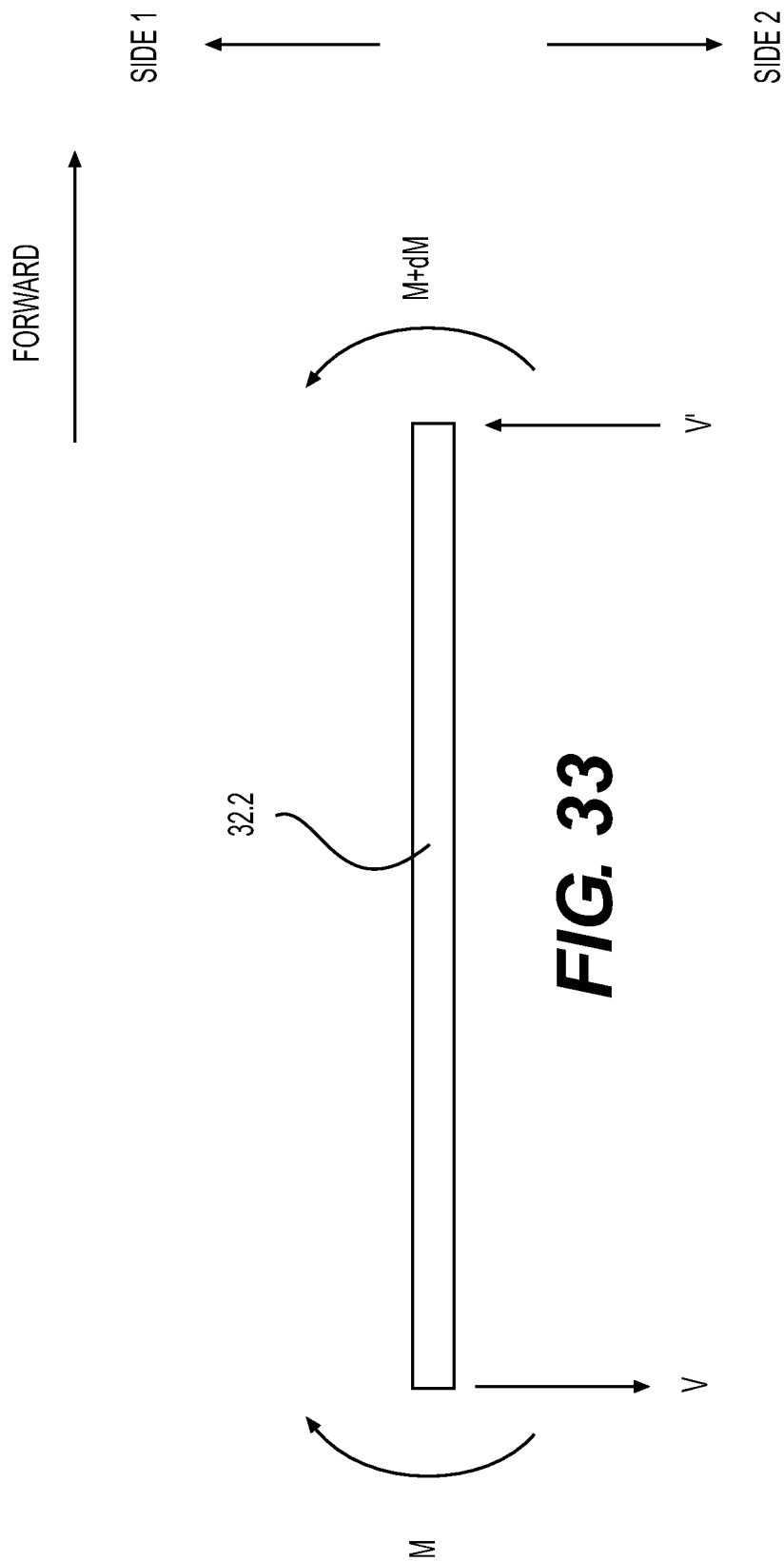
FIG. 33 is a top schematic plan view of a skirt panel with moment and shear forces thereon.

In FIG. 33 and Equation 1 below, V=shear Force and M is the bending moment about the interconnecting edge 136. As it is indicated, the shear force per unit of length will cancel and balance each other.

On 10° degree cut skirt, the bending moment per unit deflection required along the joint line is more due to longer joint than that of straight cut joint and results in a more significant rotational stiffness. The bending moment along the skirt panel 31 is applied with a phase difference at different points on the 10° joint due to its inclination along the length of the skirt panel 31. Therefore, the bending waves cannot be set up easily as in straight case. On 10° degree cut skirt portion 32, the bending wave propagates along the skirt panel 31 from one panel portion 32 to another through the bolted joints one by one, as the bolts are inclined unlike straight cut skirt.

Figure 35:
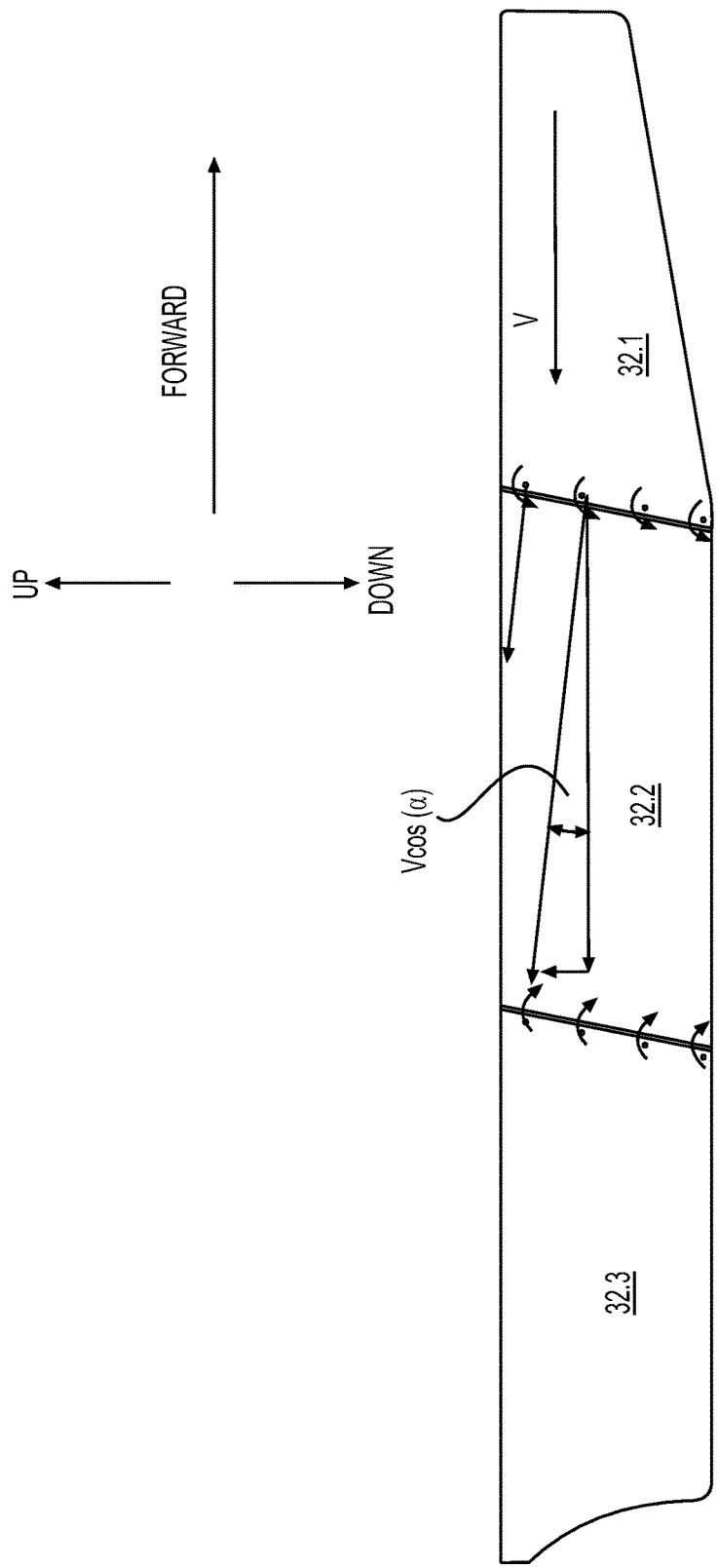
FIG. 35 is a schematic side elevational view of a skirt panels assembly joined with an angled interconnecting edge schematically illustrating a vectorial force separation of an exemplary shock wave transmission along the skirt panel.

A vibration wave travelling along the length of the skirt with a velocity of V after impacting with 1st joint will tend to change its direction perpendicular to the joint as illustrated in FIG. 35. The magnitude of this velocity is the product of initial velocity and cosine of the angle. This phenomenon when observed all along the length of the joint from bottom towards top of the joint, the velocity waves emerging at top portion of the joint will bounce back and forth on the top portion of the panel and these returning waves interfere with primary waves emerging from the joint and hence these waves will be out of phase with respect to each other. While in a straight cut skirt, the wave will propagate and pass onto the next panel without change in direction.

Figure 34:
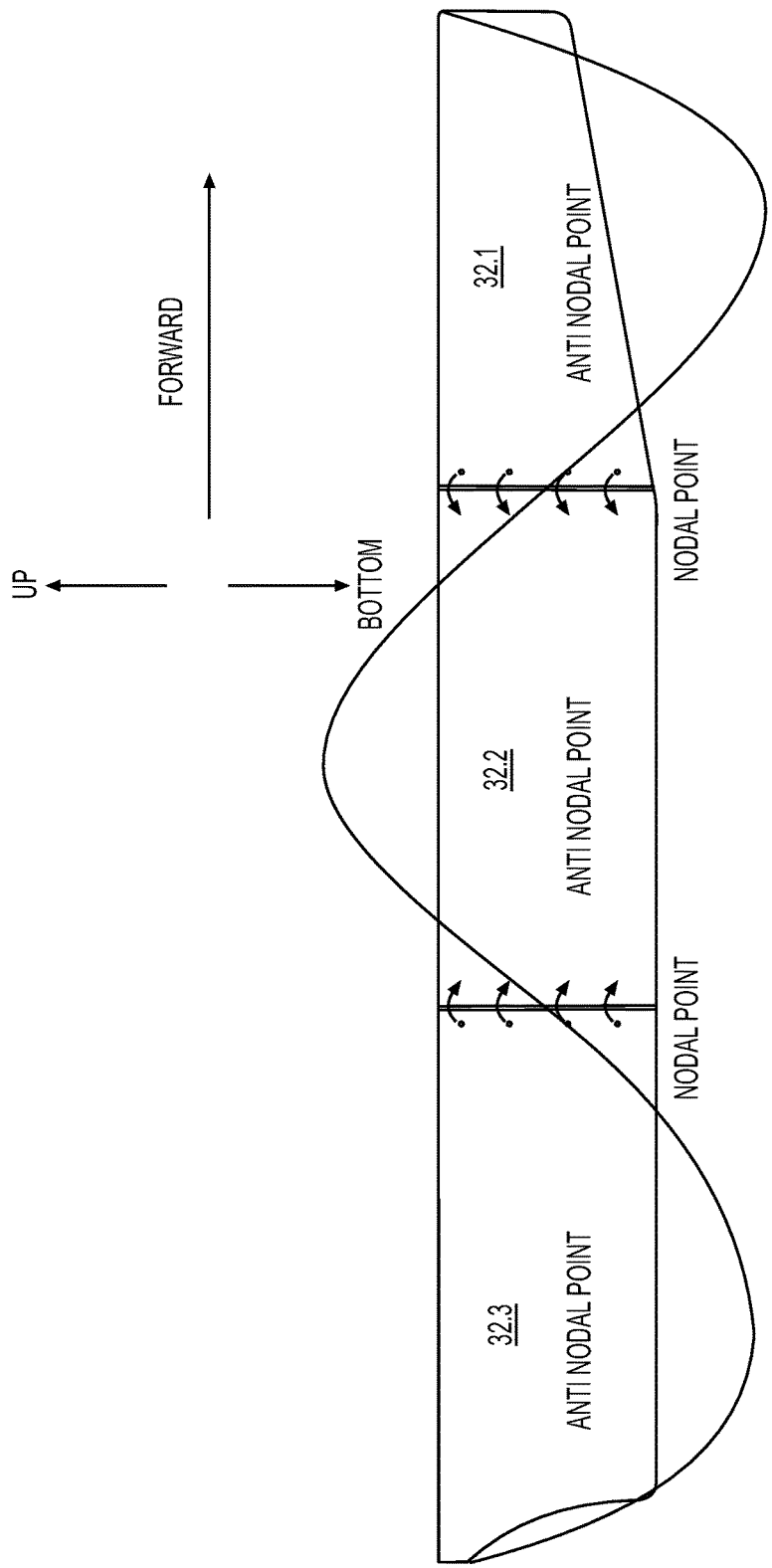
FIG. 34 is a schematic side elevational view of a skirt panels assembly joined with vertical interconnecting edges schematically illustrating an exemplary shock wave transmission along the skirt panel.

There is an established standing waves on the straight cut skirt with maximum displacement at anti nodal points as depicted in FIG. 34. While on the 10° degree cut skirt portion 32, the displacement is lower as the vibration waves have a change in their course after passing through the inclined joint and have difference in phase. Consequently, there will be less displacement at anti nodal point. As a result, the 10° degree cut skirt portion 32 is superior to a vertically straight cut skirt portion 32.

A more progressive transmission of the bending wave 180 implies that the total energy carried by the bending wave 180 is transmitted over a longer period of time and the maximum peak mechanical stress transmitted to the skirt panel 31 interconnecting edge 136 is reduced hence requiring less fasteners 116 to sustain the transmitted mechanical stress from one skirt portion 32.1 to an adjacent skirt portion 32.2. The holes 152 are also required to be less sturdy and have a reduced likelihood of breaking under load.

The bending wave propagating progressively from one skirt portion 32.1 to the adjacent skirt portion 32.2 through an angled interconnecting edge 136, the fasteners securing both skirt portions 32 are progressively sustaining the bending wave. The fasteners 116 are supporting peak stress one by one as fasteners are disposed along a 10° angle and not aligned like they are at 90° angle. This effect is represented by the following equation:

$$V' = V \times \cos(10°) \quad \text{Equation 1}$$

This means that, for example:

TABLE 2

| V | angle α | V' | V − V' | Difference (%) |
|---|---|---|---|---|
| 100 | 10° | 98.48 | 1.52 | −1.5% |

A bending wave 180 travelling along the length of the skirt panel 31 with a velocity of V' after impacting the first joint, at the interconnecting edge 136, will tend to change its direction perpendicular to the interconnecting edge 136. The magnitude of the velocity V' is the product of initial velocity V and cosine of the angle α. The velocity waves emerging at top portion of the interconnecting edge 136 will bounce back and forth on the top portion of the skirt panel 31 when observed all along the length of the interconnecting edge 136, from bottom towards top. In contrast, in a straight interconnecting edge 136 at 90°, the wave will propagate and pass onto the next skirt panel 32 without change in direction.

As a result, illustrated in FIG. 35, there is an established standing waves on the straight cut interconnecting edge 136 at 90° with maximum displacement at anti nodal points. While on the 10° degree interconnecting edge 136 skirt panel 32, the displacement is lower as the vibration waves have a change in their course after passing through the inclined interconnecting edge 136 joint and have a difference in phase. Therefore, less displacement at anti nodal point is resulting from a 10° interconnecting edge 136 skirt superior to straight 90° interconnecting edge 136 skirt panel 32.

The trailer 10 has a forced frequency about which its mechanical structure becomes "excited" and vibrations of the trailer 10 are transmitted to the skirt assembly 30 at the forced frequency. When the mechanical structure of the trailer 10 is excited, it vibrates. Natural frequency is the frequency at which a system tends to oscillate in the absence of any driving or damping force. Free vibrations of any elastic body is called natural vibration and happens at a frequency called natural frequency. Natural vibrations are different from forced vibration that happen at frequency of applied force (forced frequency). If forced frequency is equal to the natural frequency, the amplitude of vibration increases manifold. This phenomenon is known as resonance. The natural frequency of the skirt assembly 30 and the forced vibration of the trailer 10, due to trailer 10 vibrations, should be different. It is desirable to design and "tune" a skirt assembly 30 in a way that the natural frequency of the skirt assembly 30 is not in sync with the forced frequency of the trailer 20. Experimental testing has found that the skirt assembly 30 presented in the embodiments has two natural frequencies. A first natural frequency at about 7.1 Hz and a second natural frequency at about 15.5 Hz. It is therefore desirable that the forced frequency of the trailer 20 be different.

Figure 36:
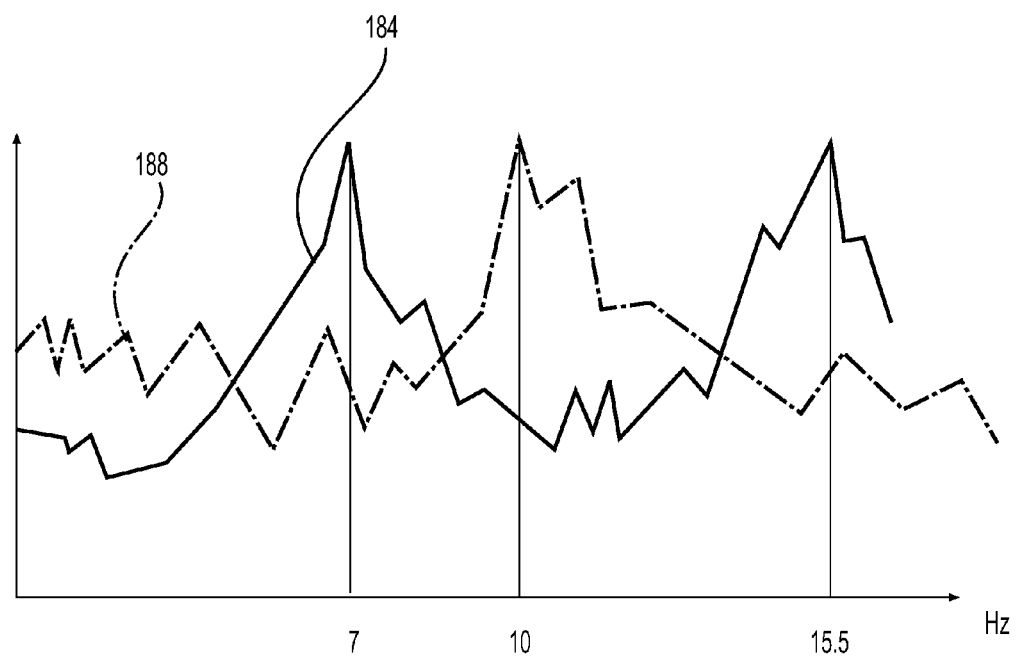
FIG. 36 is a schematic illustration of a graph with showing a forced frequency curve and a natural frequency curve of an aerodynamic skirt assembly.
Figure 37:
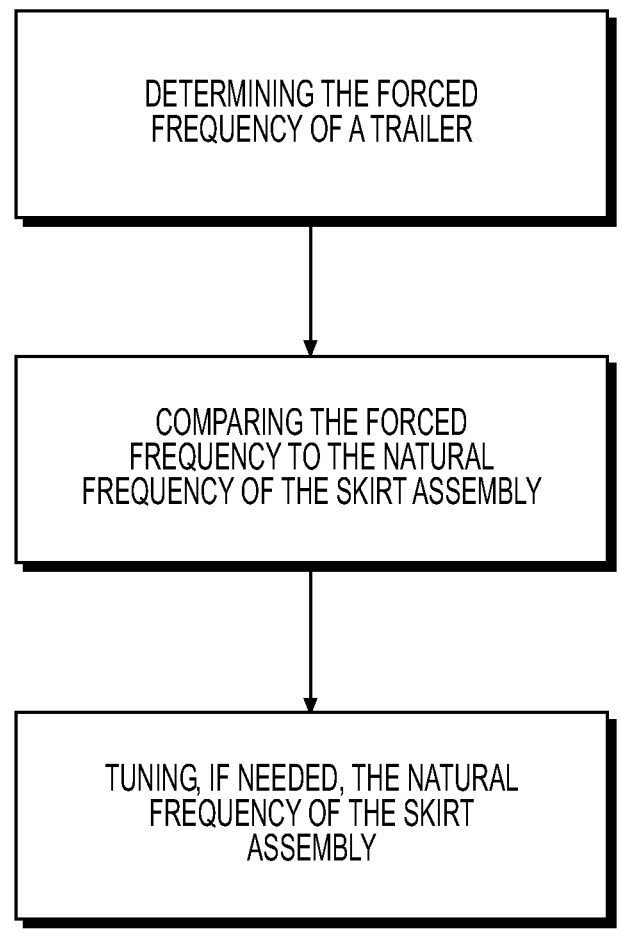
FIG. 37 is a schematic flow chart in accordance with an embodiment of the present application.

Frequency tuning of the skirt assembly 30 can be made in various ways. One way consists in moving the securing locations of the supports 40 and the struts 42 on the skirt panel 31. Changing the securing locations of the supports 40 and the struts 42 is modifying the natural frequencies of the skirt panel 31. Minor changes in the location of a support 40 or a strut 42 can be enough to cause a significant change in the natural frequencies of the skirt panel 31. Disposing supports 40 between two adjacent skirt portions 32.1, 32.2, 32.3 could be efficient to change in the natural frequencies of the skirt panel 31. This is an explanation of how the natural frequencies of the skirt panel 31 is a parameter to consider and one example how to tune the natural frequencies of the skirt panel 31. The natural frequencies of the skirt panel 31 are dependent on various parameters like the size of the skirt, its material, and its shape, among others. It can be evaluated by vibration behavioral analysis. The present invention provides an illustrative example of a specific embodiment however, the consideration of the natural frequencies of the skirt panel 31 and tuning thereof is considered to be within the scope of the present invention. The forced frequency of the trailer 10 can vary depending of the trailer configuration, speed, the material used in its manufacturing, the cargo load, the speed, taken individually or collectively. The installation of the skirt assembly 30 to a trailer 10 can include a method including steps of determining the more significant forced frequencies of the trailer 10 and adjust the installation of brackets to the skirt assembly 30 accordingly. FIG. 36 exemplifies the above with a chart illustrating the natural frequencies 184 of the skirt assembly 30 and a forced frequency 188 of the trailer 10. The trailer 10 natural frequencies 184 and peak forced frequencies 188 are not superposed in the illustrated embodiment. FIG. 37 illustrate a typical flow chart for determining the tuning of a skirt assembly 30 that could be desirable to avoid a forced frequency that is exciting the natural frequencies of a skirt assembly 30.

Figure 38:
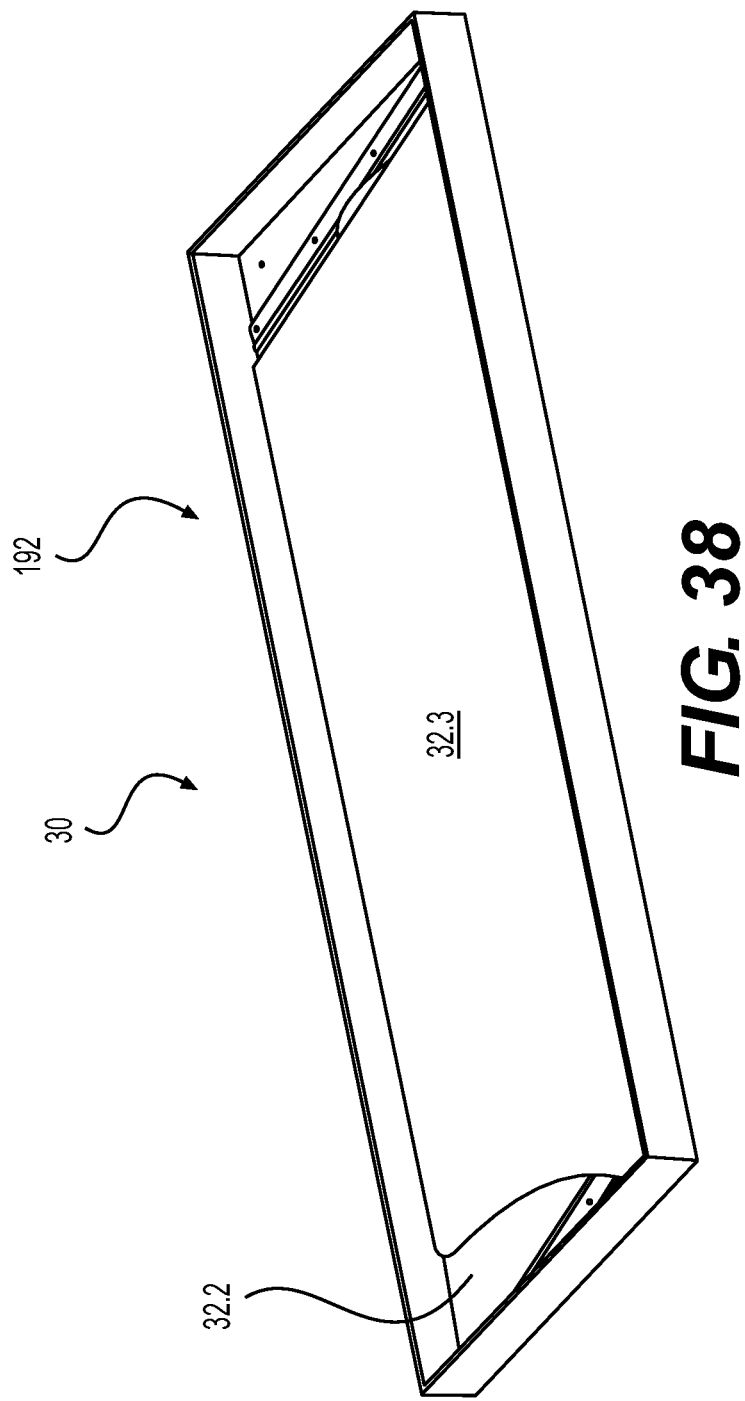
FIG. 38 depicts an isometric view of a cargo configuration in accordance with an embodiment of the present application.
Figure 39:
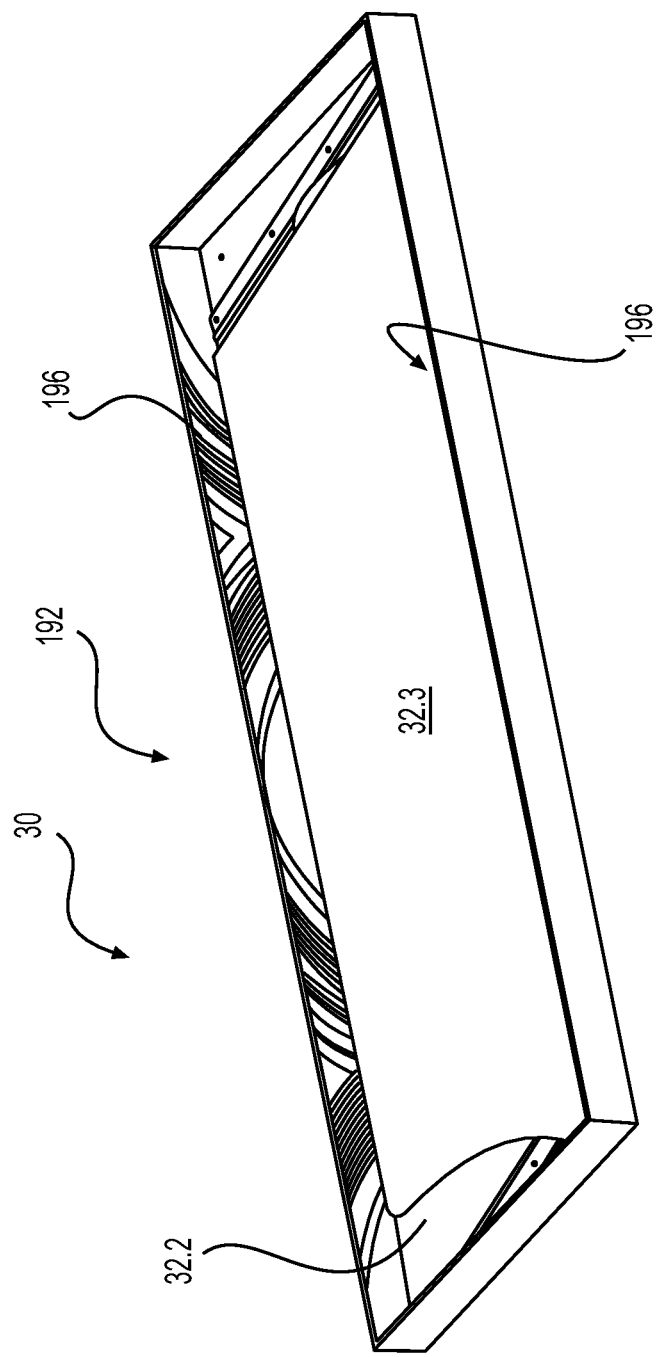
FIG. 39 depicts an isometric view of a cargo configuration in accordance with an embodiment of the present application.
Figure 40:
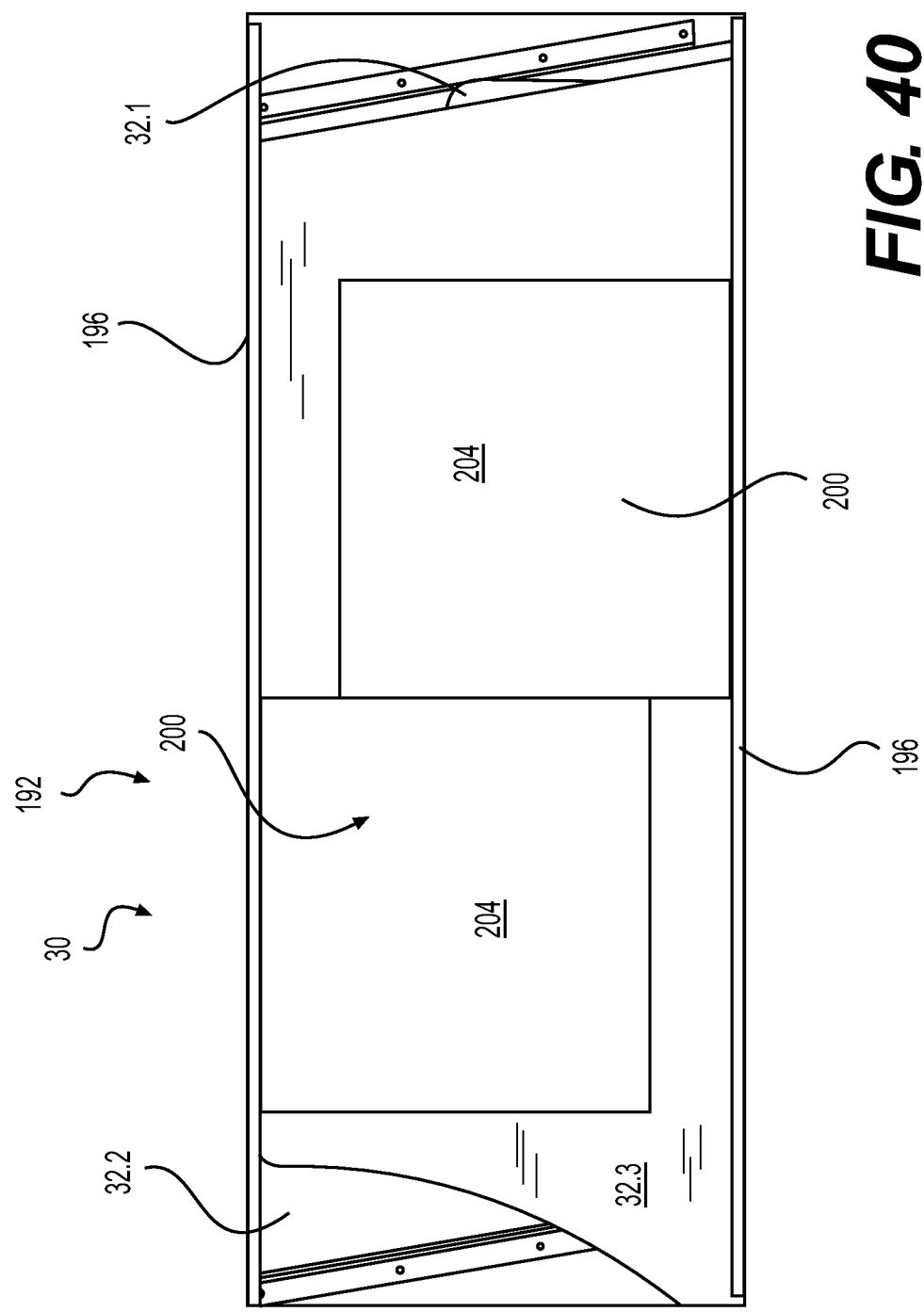
FIG. 40 depicts a top plan view of a cargo configuration in accordance with an embodiment of the present application.
Figure 41:
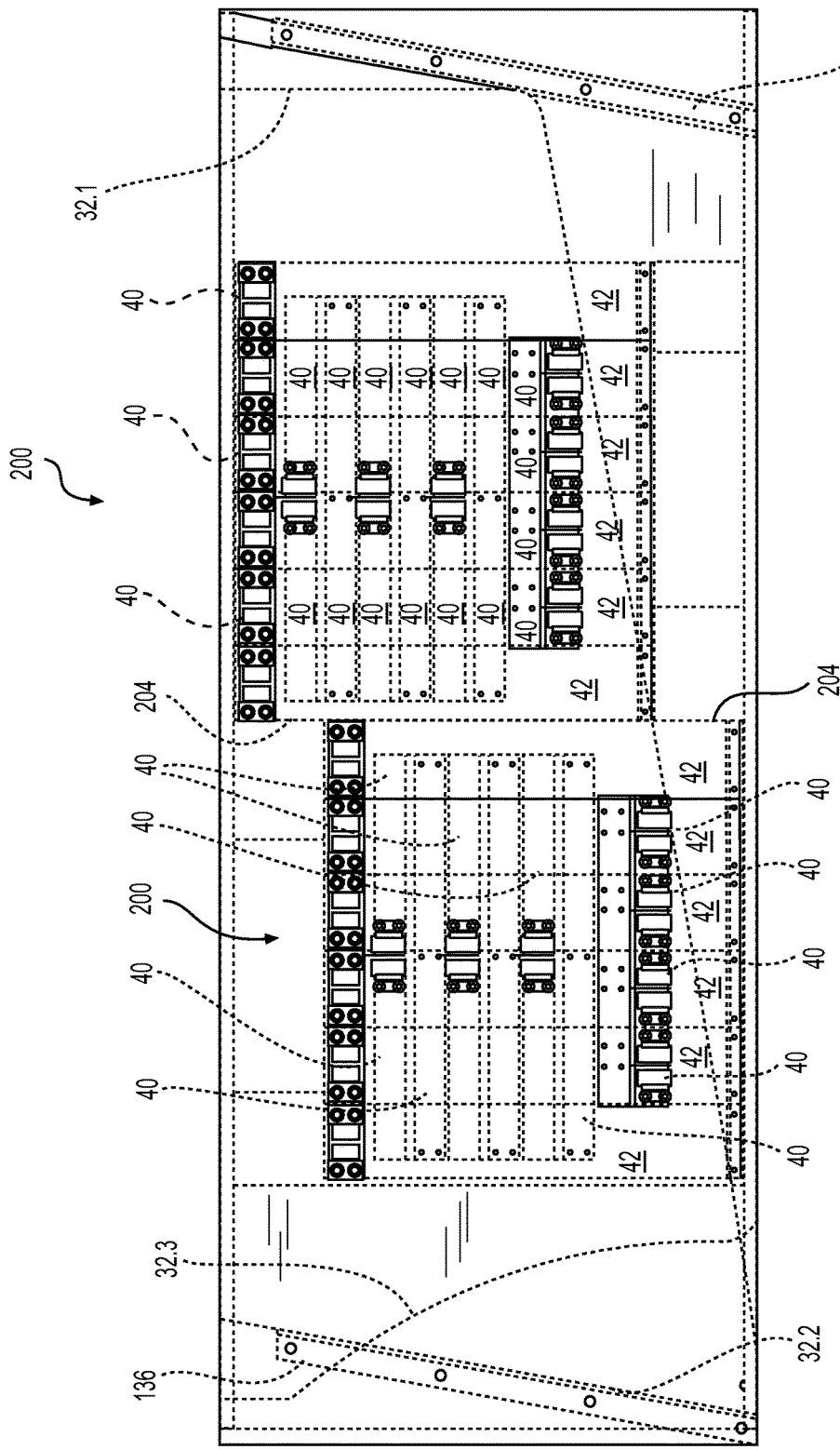
FIG. 41 depicts a top plan view of a cargo configuration in accordance with an embodiment of the present application.
Figure 42:
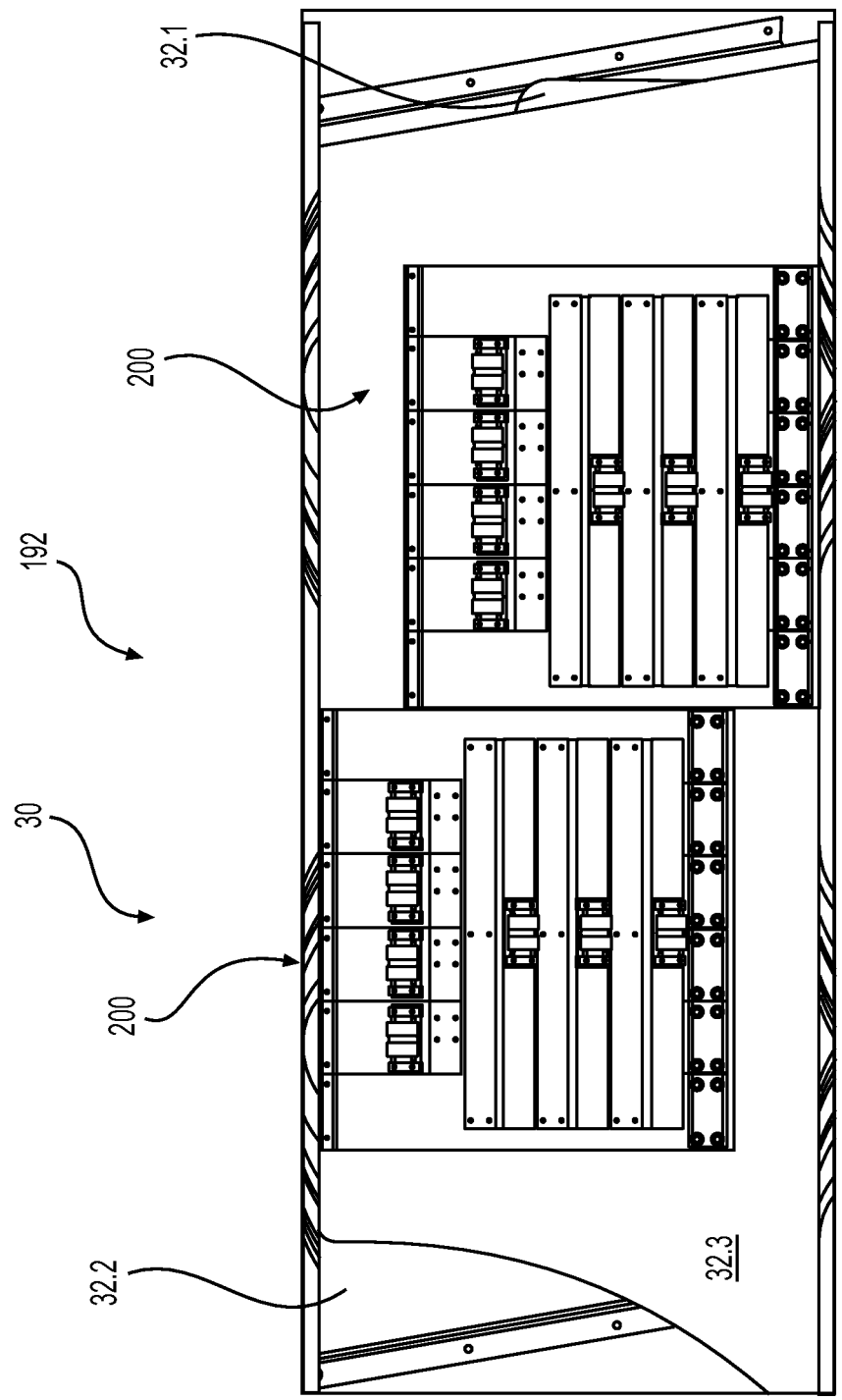
FIG. 42 depicts a top plan view of a cargo configuration in accordance with an embodiment of the present application.
Figure 45:
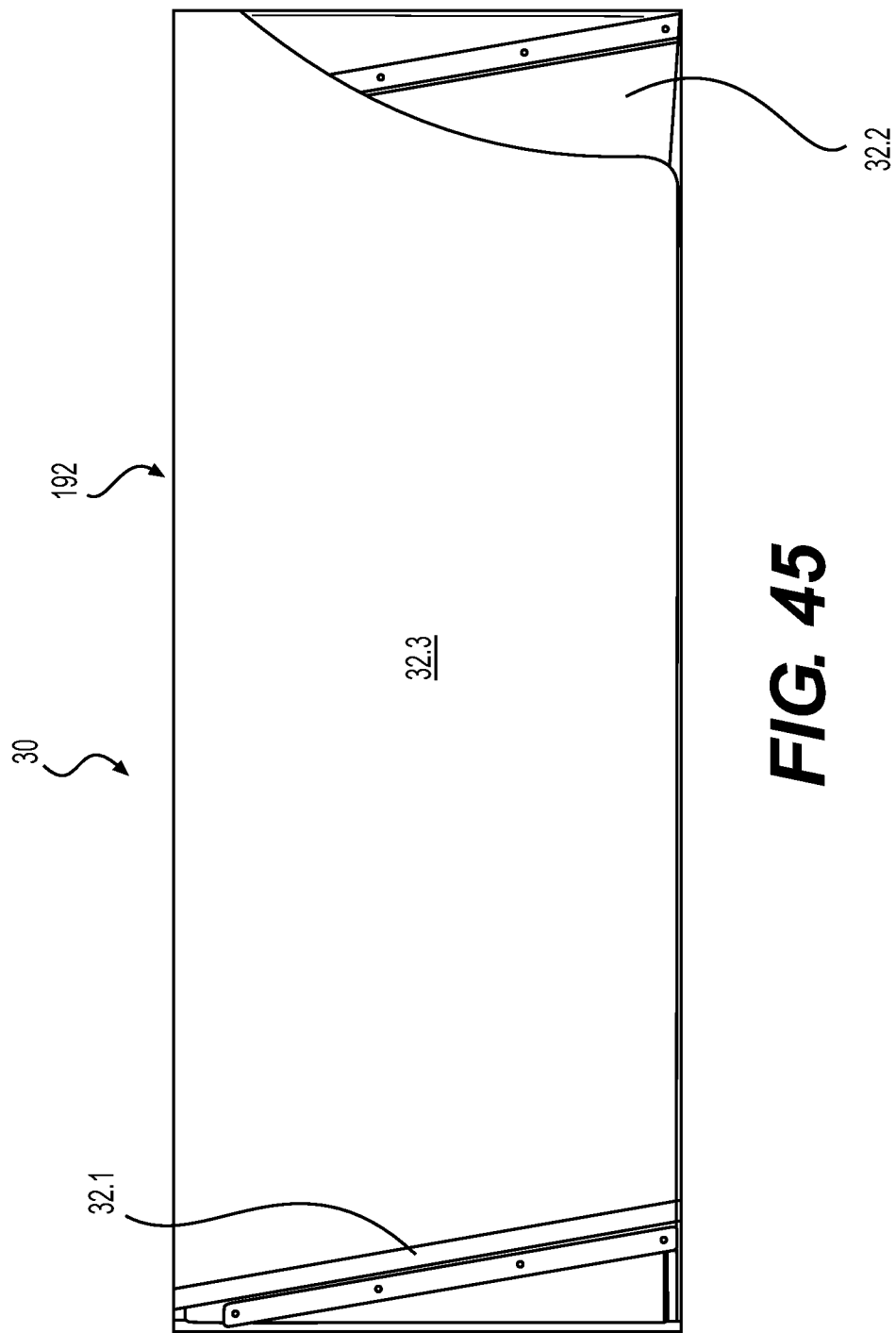
FIG. 45 depicts a top plan view of a cargo configuration in accordance with an embodiment of the present application.
Figure 46:
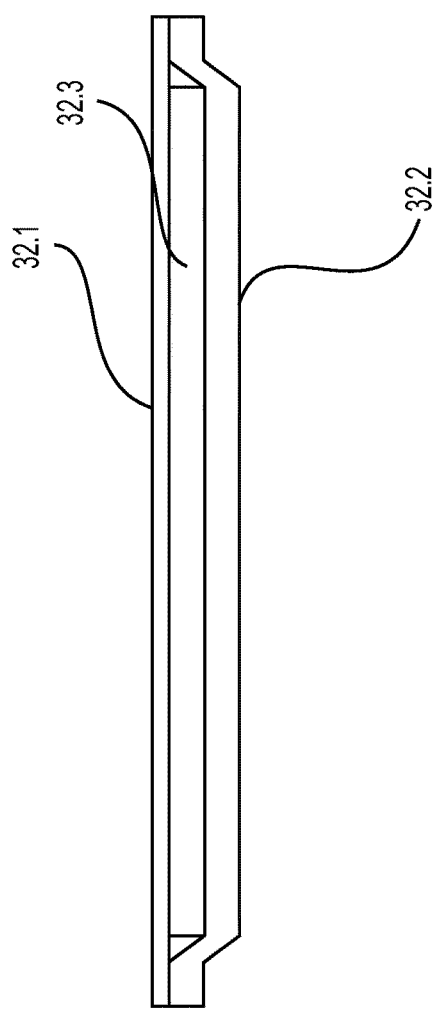
FIG. 46 depicts a skirt portions staking for compact and secure transportation thereof.

FIG. 38 throughout FIG. 45 are illustrating a cargo configuration 192 for shipment of the modular skirt assembly 30. Cargo configuration 192 size of a modular skirt assembly 30 is a fraction of a non-cargo configuration size of a non-modular skirt assembly 30. The cargo configuration 192 embodied in FIG. 38 throughout FIG. 45 is one configuration of parts adapted for shipment and other configurations could become apparent for a skilled reader and remain within the scope of the present application. FIG. 38 illustrates the three skirt portions 32.1, 32.2 and 32.3 superposed on a first side of a cargo box or the like. The three skirt portions 32.1, 32.2 and 32.3 forming a first layer are thus providing a compact arrangement that offers rigidity to the cargo configuration and also protects the additional parts 200 that are going to be stacked over. The cargo configuration 192 includes preferably two supports 196 above and below the three superposed skirt portions 32.1, 32.2 and 32.3 as it is illustrated in FIG. 39. The two supports 196 can be made or rigid and inexpensive materials like wood, plastic or cardboard. Then the additional parts 200 are disposed over the stacked skirt portions 32.1, 32.2 and 32.3. The additional parts 200 are preferably secured in boxes 204 for easy manipulation and to prevent relative moments thereof in the cargo configuration 196. The additional parts 200 are generally, for a standard modular skirt assembly 30, struts 42, supports 40 and fasteners 116 as depicted in FIG. 41, FIG. 42, FIG. 43 and FIG. 44.

Figure 43:
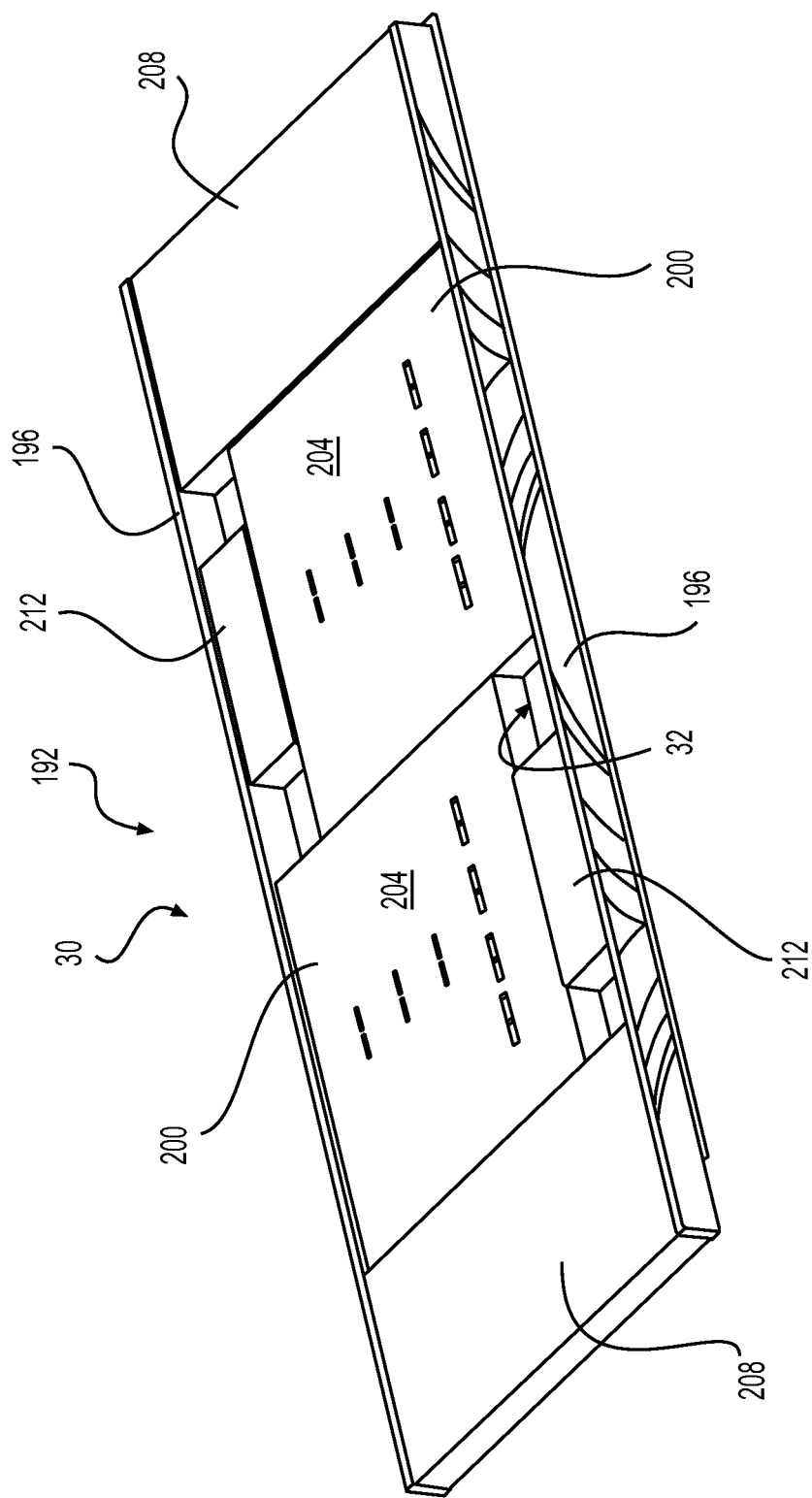
FIG. 43 depicts an isometric view of a cargo configuration in accordance with an embodiment of the present application.
Figure 44:
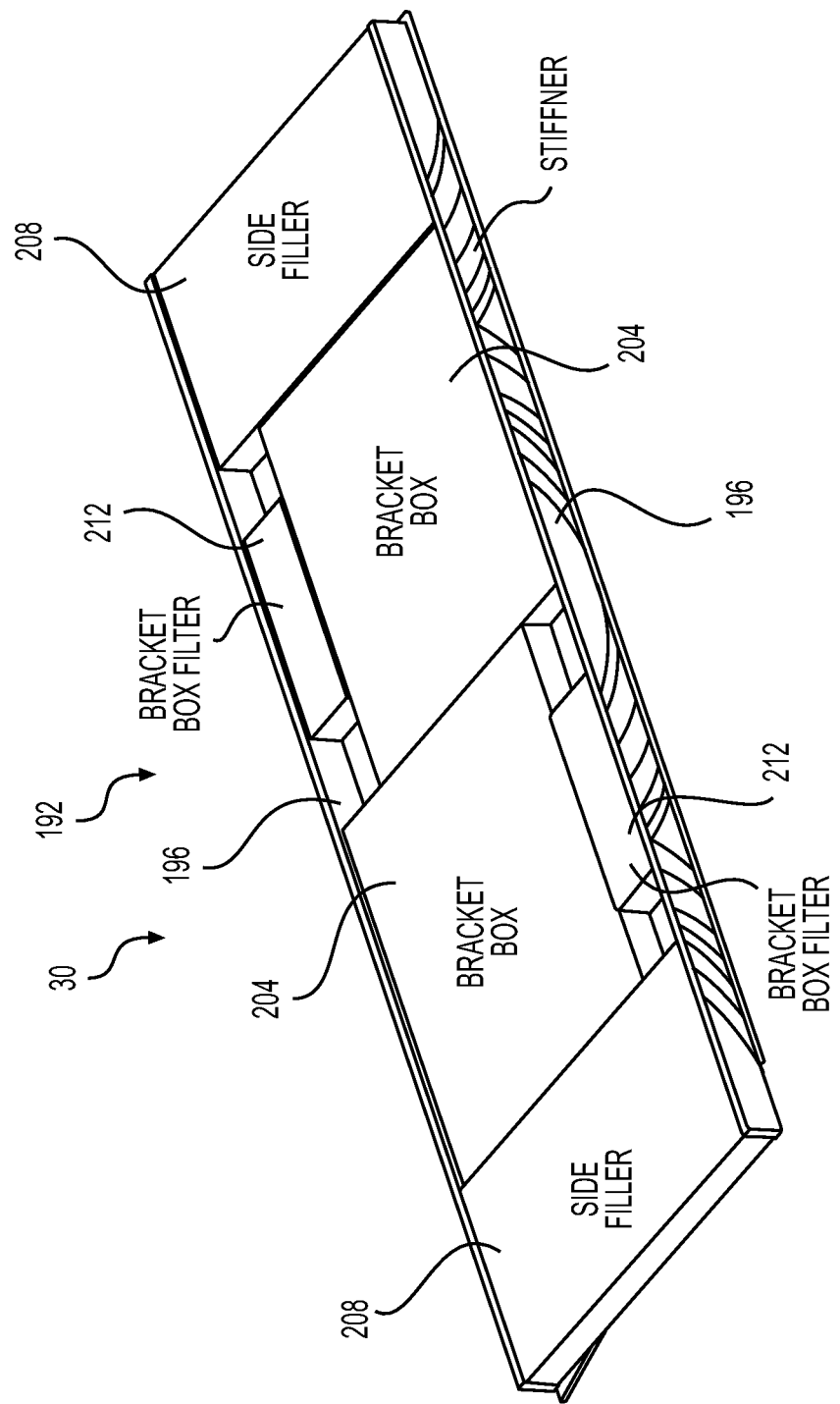
FIG. 44 depicts an isometric view of a cargo configuration in accordance with an embodiment of the present application.

The cargo configuration 192 depicted in FIG. 43 includes additional side fillers 208 and bracket box fillers 212 on the upper and lower sides of the cargo configuration 196. Fillers 208, 212 can be embodied as cardboard boxes, foam or any suitable filling material adapted to keep the parts of the modular skirt assembly 30 at their respective locations in the cargo configuration 192. Additional elements to be shipped with the modular skirt assembly 30 can be inserted in the fillers 208, 212 if needed. One can appreciate the opposed symmetrical arrangement of the boxes 204 and the fillers 208, 212 to ensure a balanced weight that is going to ease transportation of the cargo load. In turn, FIG. 45 depicts the final layout of the cargo configuration 192 with the second skirt panel portions 32.1, 32.2, 32.3 stacked on the top of the other parts. The three skirt portions 32.1, 32.2 and 32.3 forming a second layer, opposed to the first layer, are thus providing a compact arrangement that offers rigidity to the cargo configuration and also protects the additional parts that are located between the two layers of skirt portions 32.1, 32.2 and 32.3. Once all the parts are disposed in the cargo configuration, the overall package can be covered with cardboard, plastic or the like to be shipped as cargo having a significantly reduced size.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A method of packaging a modular aerodynamic skirt panel, the method comprising:
   providing a skirt panel including a plurality of skirt portions, the plurality of skirt portions including a first skirt portion, a second skirt portion and a third skirt portion, the second skirt portion including two interconnecting edges disposed at a non-90° angle from an upper edge thereof, each interconnecting edge including a pair of interconnecting stepped edges offset from a surface of the second skirt portion by about a thickness of a skirt portion for securing thereon a cooperating edge of another skirt portion;
   providing a plurality of supports for securing the plurality of skirt portions to a trailer in an aerodynamic configuration when the skirt panels are secured to a trailer; and
   stacking the plurality of skirt portions in a shipping container, wherein the shipping container includes four sides generally abutting at a 90° angle thereof and wherein at least one of the interconnecting edge and the upper edge is non-parallel and non-perpendicular with the sides of the shipping container, the first skirt portion being disposed over the second skirt portion between the pair of each interconnecting edge of the second skirt portion and bordered by the stepped edges of the second skirt portion, the third skirt portion being disposed over and supported by the second skirt portion and the two stepped edges so that the third skirt portion is encapsulated by the second skirt portion and the first skirt portion.

2. The method of claim 1, further comprising stacking a plurality of connectors configured to interconnect the plurality of skirt portions to the trailer on the stacked skirt portions.

3. The method of claim 1, wherein the upper edge of at least one of the stacked skirt portions is substantially parallel with a side of the shipping container.

* * * * *